United States Patent
Klein et al.

(10) Patent No.: US 10,021,552 B2
(45) Date of Patent: *Jul. 10, 2018

(54) ROUTE MANAGEMENT

(71) Applicant: AT&T Intellectual Property I, L.P., Atlanta, GA (US)

(72) Inventors: Craig Arthur Klein, San Antonio, TX (US); Gregory O. Harp, Allen, TX (US); Joseph Eric Sineath, Orange Park, FL (US); Stephen James Waken, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,670

(22) Filed: Sep. 29, 2017

(65) Prior Publication Data

US 2018/0027397 A1    Jan. 25, 2018

Related U.S. Application Data

(63) Continuation of application No. 15/406,679, filed on Jan. 14, 2017, now Pat. No. 9,813,886, which is a continuation of application No. 14/808,213, filed on Jul. 24, 2015, now Pat. No. 9,582,841.

(51) Int. Cl.
| | | |
|---|---|---|
| *H04W 4/90* | (2018.01) |
| *H04W 76/00* | (2018.01) |
| *H04W 4/021* | (2018.01) |
| *H04W 4/04* | (2009.01) |
| *H04W 4/22* | (2009.01) |
| *H04W 76/50* | (2018.01) |
| *G06Q 90/00* | (2006.01) |

(52) U.S. Cl.
CPC ............ *H04W 4/90* (2018.02); *H04W 4/021* (2013.01); *H04W 4/04* (2013.01); *H04W 4/22* (2013.01); *H04W 76/007* (2013.01); *H04W 76/50* (2018.02); *G06Q 90/205* (2013.01)

(58) Field of Classification Search
CPC ....... H04W 4/22; H04W 4/04; H04W 76/007; H04W 4/021; G06Q 90/205
See application file for complete search history.

(56) References Cited

U.S. PATENT DOCUMENTS

| | | | |
|---|---|---|---|
| 7,035,650 B1 * | 4/2006 | Moskowitz | G01C 21/20 340/995.23 |
| 7,203,497 B2 * | 4/2007 | Belcea | G01S 5/0252 340/525 |
| 7,245,900 B1 | 7/2007 | Lamb | |
| 7,315,949 B1 | 1/2008 | Cortopassi et al. | |
| 8,040,216 B2 | 10/2011 | Jordan et al. | |

(Continued)

FOREIGN PATENT DOCUMENTS

| | | |
|---|---|---|
| CN | 103780867 | 5/2014 |
| CN | 103068039 | 4/2015 |

(Continued)

*Primary Examiner* — Nathan Mitchell
(74) *Attorney, Agent, or Firm* — Scott P. Zimmerman

(57) ABSTRACT

Locational tracking aids emergency management plans. Occupants of a building or campus are determined based on presence or detection of wireless devices. When an emergency occurs, the occupants may move to safety based on the current locations of their wireless devices.

20 Claims, 36 Drawing Sheets

(56) References Cited

U.S. PATENT DOCUMENTS

| | | | |
|---|---|---|---|
| 8,618,931 B2 | 12/2013 | Rossmann et al. | |
| 8,749,392 B2 * | 6/2014 | Wedig | G08B 7/066 340/286.05 |
| 8,922,433 B2 | 12/2014 | Whiting et al. | |
| 9,080,883 B2 * | 7/2015 | Frey | G08B 7/066 |
| 2003/0103075 A1 | 6/2003 | Rosselot | |
| 2004/0006697 A1 | 1/2004 | Noyama | |
| 2004/0201470 A1 * | 10/2004 | Reed | G08B 7/062 340/506 |
| 2005/0014522 A1 | 1/2005 | Tirabassi | |
| 2006/0273878 A1 | 12/2006 | Michmerhuizen | |
| 2007/0049259 A1 * | 3/2007 | Onishi | A62B 99/00 455/414.2 |
| 2008/0057873 A1 | 3/2008 | Huang et al. | |
| 2008/0195665 A1 | 8/2008 | Mason | |
| 2009/0138353 A1 * | 5/2009 | Mendelson | G01C 21/206 705/14.39 |
| 2009/0170468 A1 * | 7/2009 | Kane | H04W 4/22 455/404.2 |
| 2009/0247116 A1 * | 10/2009 | Sennett | H04M 11/04 455/404.2 |
| 2009/0270065 A1 * | 10/2009 | Hamada | G01C 21/20 455/404.1 |
| 2010/0075656 A1 | 3/2010 | Howarter | |
| 2010/0136945 A1 * | 6/2010 | Givens | G06Q 10/04 455/404.2 |
| 2010/0164732 A1 * | 7/2010 | Wedig | G08B 7/066 340/577 |
| 2010/0246522 A1 * | 9/2010 | Hirose | H04W 84/20 370/329 |
| 2010/0321722 A1 | 12/2010 | Koga | |
| 2011/0130636 A1 * | 6/2011 | Daniel | G08B 25/016 600/301 |
| 2011/0136463 A1 * | 6/2011 | Ebdon | G01C 21/20 455/404.1 |
| 2012/0047083 A1 * | 2/2012 | Qiao | A62C 99/009 705/325 |
| 2012/0068818 A1 | 3/2012 | Mizon | |
| 2012/0072106 A1 | 3/2012 | Han et al. | |
| 2012/0075068 A1 | 3/2012 | Walker | |
| 2012/0077438 A1 | 3/2012 | Jung | |
| 2012/0268243 A1 | 10/2012 | Kappeler | |
| 2012/0280789 A1 | 11/2012 | Gerhardt | |
| 2013/0225115 A1 * | 8/2013 | Sasaki | G08B 27/006 455/404.1 |
| 2013/0262223 A1 | 10/2013 | Catane et al. | |
| 2013/0339478 A1 | 12/2013 | Edge | |
| 2014/0087686 A1 | 3/2014 | Lee | |
| 2014/0149771 A1 | 5/2014 | Krishna | |
| 2014/0222562 A1 * | 8/2014 | Akgul | G06Q 30/0261 705/14.53 |
| 2014/0232522 A1 | 8/2014 | Schmidt-Lackner et al. | |
| 2014/0235266 A1 | 8/2014 | Edge et al. | |
| 2014/0253285 A1 | 9/2014 | Menzel | |
| 2014/0273910 A1 | 9/2014 | Ballantyne | |
| 2014/0293865 A1 * | 10/2014 | Shi | G08B 21/10 370/312 |
| 2014/0335823 A1 | 11/2014 | Heredia | |
| 2015/0045054 A1 | 2/2015 | Emadzadeh et al. | |
| 2015/0075914 A1 | 3/2015 | Armistead | |
| 2015/0098442 A1 | 4/2015 | Shatsky et al. | |
| 2015/0179012 A1 | 6/2015 | Sharpe | |
| 2015/0228153 A1 * | 8/2015 | Hedrick | G07F 17/3225 463/25 |
| 2015/0281960 A1 | 10/2015 | Keisala | |
| 2015/0327039 A1 | 11/2015 | Jain | |
| 2015/0334530 A1 * | 11/2015 | Scott | G06Q 50/22 455/456.1 |
| 2016/0088658 A1 * | 3/2016 | Padden | H04W 74/0816 370/338 |
| 2016/0127878 A1 * | 5/2016 | Clarke | G08B 27/005 705/324 |
| 2016/0192163 A1 * | 6/2016 | Miner | H04W 4/22 455/404.1 |
| 2016/0205514 A1 * | 7/2016 | Ikeda | H04W 4/043 455/456.1 |

FOREIGN PATENT DOCUMENTS

| | | |
|---|---|---|
| JP | 11295097 A | 10/2009 |
| JP | 2012087462 A | 5/2012 |
| WO | WO 2010150031 | 12/2010 |

\* cited by examiner

ROUTE MANAGEMENT

CROSS-REFERENCE TO RELATED APPLICATIONS

This application is a continuation of U.S. application Ser. No. 15/406,679 filed Jan. 14, 2017 and since issued as U.S. Pat. No. 9,813,886, which is a continuation of U.S. application Ser. No. 14/808,213 filed Jul. 24, 2015 and since issued as U.S. Pat. No. 9,582,841, with both applications incorporated herein by reference in their entireties. This application also relates to the following co-pending applications, which are all incorporated herein by reference in their entireties: U.S. application Ser. No. 14/666,356 filed Mar. 24, 2015; U.S. application Ser. No. 14/666,361 filed Mar. 24, 2015; and U.S. application Ser. No. 14/684,338 filed Apr. 11, 2015.

BACKGROUND

First responders need accurate information. When emergency personnel encounter a rescue situation, real time information describing occupants helps focus the rescue efforts. Accurate information fosters quick decisions that save lives.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
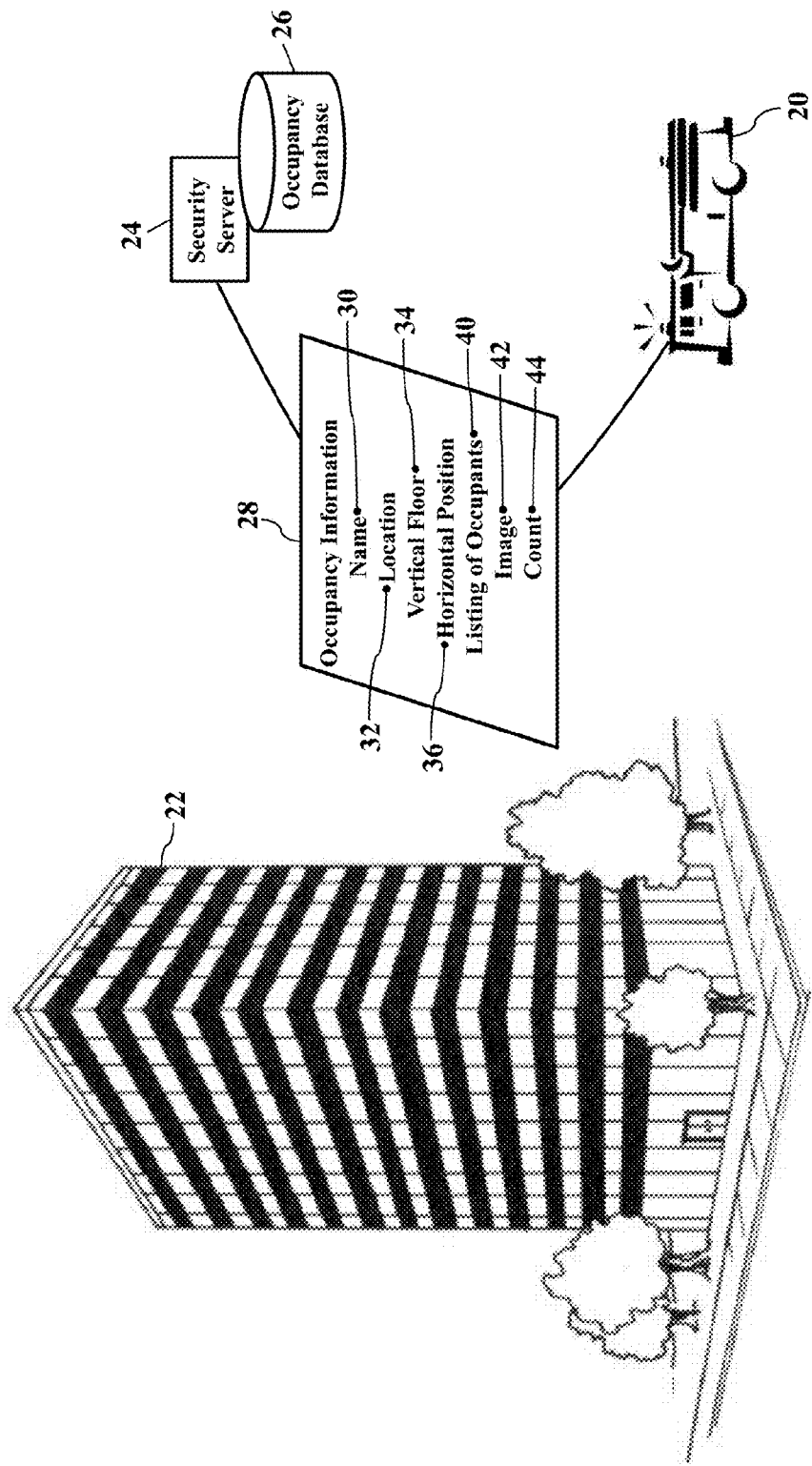
FIGS. 1-5 are simplified illustrations of an environment in which exemplary embodiments may be implemented.

FIGS. 1-5 are simplified illustrations of an environment in which exemplary embodiments may be implemented. FIG. 1 illustrates an emergency situation in which first responders 20 arrive at a building 22. Ordinarily the first responders 20 have no knowledge of who is inside the building 22. Here, though, the first responders 20 may access a security server 24 that maintains an occupancy database 26. The occupancy database 26 contains occupancy information 28 describing the occupants inside the building 22. That is, the occupancy information 28 may identify each occupant by a name 30 and a current location 32 inside the building 22. The current location 32 may even be identified by vertical floor 34 and a horizontal position 36 on the vertical floor 34, such as a room or desk. The first responders 20 may thus quickly and easily use any computer or mobile communications device to query the security server 24 for the current occupancy information 28 describing the occupants inside the building 22. The security server may then generate a listing 40 of occupants currently located inside or even near the building 22. The listing 40 of occupants lists the name 30 and the current location 32 of each person (and even pets) associated with the building 22. The listing 40 of occupants may even include a digital image 42 of each occupant and various counts 44 of the occupants, such as by floor, room, and total. The occupancy information 28 is complied using wireless tracking technologies and network registrations, which later paragraphs will explain. Indeed, exemplary embodiments may also comply with the Health Insurance Portability and Accountability Act ("HIPPA") of 1996 that protects the confidentiality and security of healthcare information. For example, the occupancy information 28 may retrieve and detail healthcare information that is important to the first responders 20, such as a pregnant occupant, visually or hearing impaired occupant, or a physical limitation. So, when the first responders 20 receive the occupancy information 28, the first responders 20 may thus concentrate their rescue efforts on the current locations 32 and immediate needs of the occupants.

Figure 2:
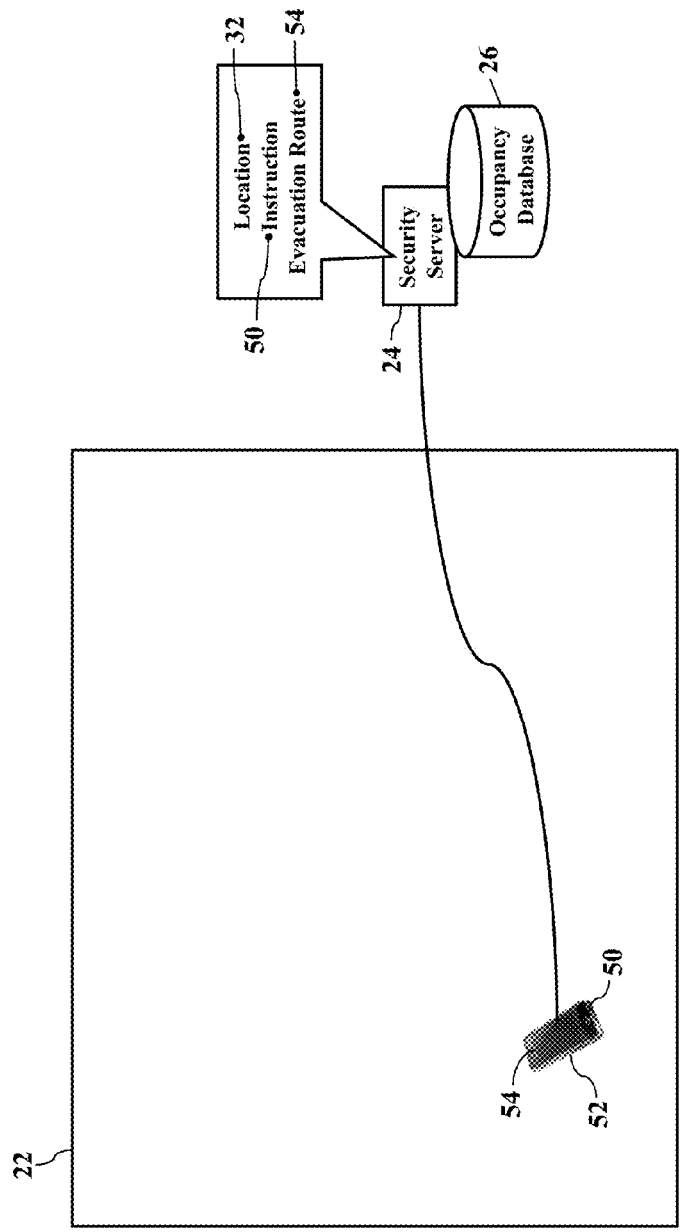

FIG. 2 illustrates personalized instructions. As the occupancy database 26 maintains the current location 32 of each occupant, exemplary embodiments may send a personalized instruction 50 to each occupant. For example, suppose an occupant carries a mobile smartphone 52. As the occupant moves within the building 22, the security server 24 tracks the movements of the occupant's smartphone 52 using wireless tracking technologies and network registrations (again, as later paragraphs will explain). During an emergency situation, the security server 24 may thus email or text the personalized instruction 50 to the occupant's smartphone 52. The personalized instruction 50 may be based on locational rules, such as predetermined text associated with the current locations 32 of the occupant and/or pre-assigned roles and tasks (such as a group leader or designated defibrillator operator), as later paragraphs will explain. Because the security server 24 monitors the current location 32 of the occupant's smartphone 52, the security server 24 may even generate and send a personalized evacuation route 54. That is, the occupant may be instructed to evacuate the building 22 by following the personalized evacuation route 54, based on the current location 32 of the occupant's smartphone 52. The occupant may thus be instructed to proceed to a particular hallway or stairwell that is closest and safest, based on the current location 32 of the occupant's smartphone 52. In other situations the occupant may be instructed to barricade in a particular room, based on the situation and the current location 32 of the occupant's smartphone 52. Other occupants, though, may receive different instructions, again based on the current locations 32 of their corresponding smartphones. Different occupants may thus receive different personalized instructions 50, all individually determined from the current location 32 of their respective smartphones. Messages may also be auto-generated and broadcasted to any or all occupants.

Figure 3:
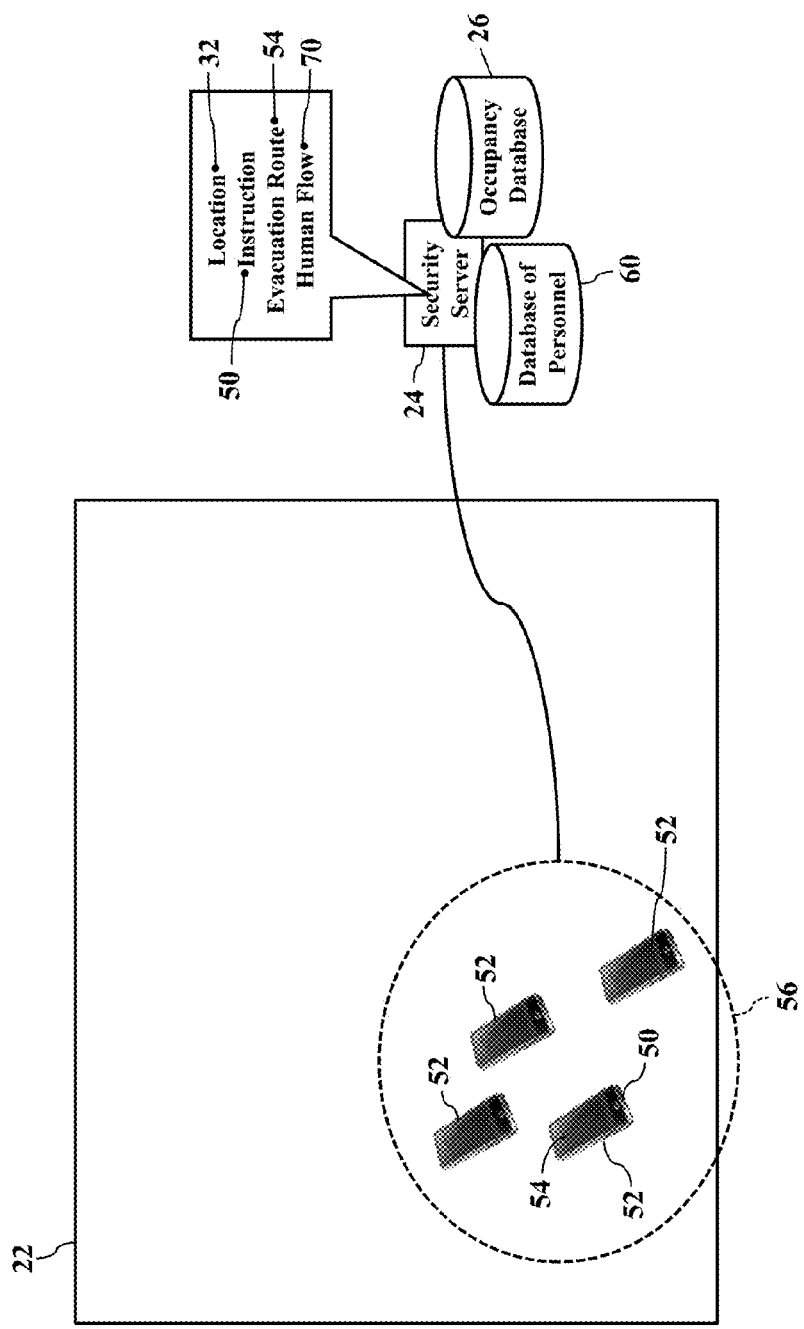

FIG. 3 illustrates centralized crisis management. Because the security server 24 monitors the current location 32 of each occupant's smartphone 52, the security server 24 may implement much faster emergency management plans than humanly possible. For example, the security server 24 may select certain occupants to receive specialized emergency instructions. A group leader, for example, may be pre-chosen based on training or expertise, as later paragraphs will explain. However, the group leader may also be selected ad hoc and instructed to lead other occupants to safety, perhaps again by following the personalized evacuation route 54. Suppose, for example, multiple occupants share the same or similar current location 32, as reported by their respective smartphones 52. The security server 24 may thus form an ad hoc group 56 and nominate or select one of the smartphones 52 to receive the personalized instructions 50, thus leading the group 56 to safety. Exemplary embodiments may thus reduce network and wireless packet traffic by selecting a leader to receive messages and instructions. Any leader may preferably be chosen based on training or other profile qualifications, as detailed in a database 60 of personnel (as later paragraphs will explain).

Human flow 70 may be monitored. As many people carry a mobile smartphone, the security server 24 may monitor the human flow 70 of the occupants along hallways, stairwells, and other corridors within the building 22. The human flow 70 may be measured, or counted, based on the movement of the occupants' mobile devices (such as smartphones and wearables). The security server 24 may thus count or sum the mobile devices in an area having the same, or similar current location 32. As the count or sum changes with time, a rate (such as the number of mobile devices per second) of the human flow 70 may be determined. Particular occupants or groups may thus be directed along different evacuation routes 54, based on the current location 32 and the human flow 70. Unsafe bottleneck congestions may thus be avoided, based on a safe threshold flow associated with an area. Indeed, most areas may only safely convey a maximum human flow 70, as doorways and stairwells often create dangerous stampede situations. Traffic may be moved away from dangerous areas or hazards. Paths may be created or opened for the first responders to move through crowds. People with special needs may be directed along different paths to different locations. Occupants may thus receive individual electronic texts, emails, calls, or other notifications according to the current location 32 of their smartphone 52. Exemplary embodiments may thus divert the human flow 70 from one area to another area in order to avoid congestion and standstill. Exemplary embodiments may thus monitor the human flow 70 to move the occupants to, or away, from locations, thus auto-directing people to safety.

Figure 4:
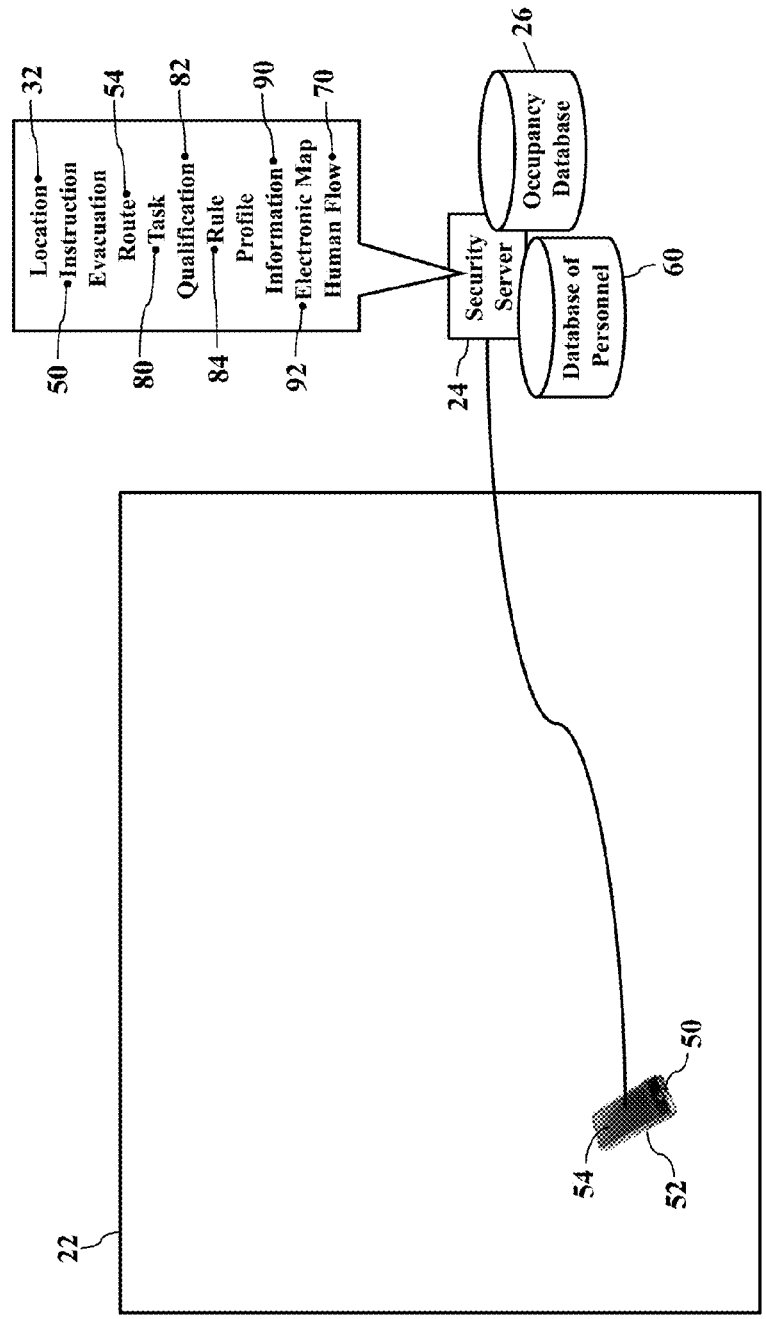

FIG. 4 illustrates emergency collaboration. Here exemplary embodiments may assign tasks 80 to certain individuals, based on the current location 32 of their smartphone 52. Some of the occupants, for example, may have specialized qualifications 82 that may be relied upon during emergency situations. For example, some occupants may have medical training. Other occupants may have technical knowledge. When the security server 24 consults the database 60 of personnel, the database information may reveal specialized qualifications 82. Some occupants may thus be selected to inspect one or more rooms for stray people. Some occupants may be selected to repair equipment. Whatever the task 80, individuals and teams may be assigned based on their qualifications 82 and the current location 32 of their smartphone 52 or other wireless device.

Exemplary embodiments thus provide real time emergency management. As each occupant's current location 32 is known (both vertically and horizontally), the security server 24 may track the directions and places the occupants are flowing. Logical rules 84 may thus be executed to ensure safe, orderly, and quick movement. Access to the database 60 of personnel also reveals what occupants require specialized needs, equipment, or pathways. The security server 24 may thus generate the personalized instruction 50 to help ensure a safe and capable rescue. For example, an occupant in a wheelchair may be directed along her personalized evacuation route 54 to a ramp or elevator, based on the current location 32 of the occupant's smartphone 52. Frail occupants may also be directed to an elevator, while more physically able occupants may be directed to a stairwell, all based on the current location 32 of the occupant's smartphone 52 and their profile information 90 in the database 60 of personnel. Electronic maps 92 may even be generated, thus providing the emergency first responders with visual confirmation of the current location 32 of each occupant. Rooms and floors may thus be quickly and methodically cleared.

Exemplary embodiments provide intelligent analytics. The occupancy database 26 provides a very accurate, real time picture of the occupants in the building 22. As the occupants move about the building 22, the occupancy database 26 tracks the occupants' movements in real time. Individuals may thus be located for quick recovery. As the occupants move, exemplary embodiments may monitor the human flow 70 to ensure safe and orderly movement. Individual occupants may receive the personalized instructions 50 to further ensure their safe and quick movement. Tasks 80 may also be individually assigned to ensure everyone is found and moved to safety. The first responders 20 may thus concentrate their efforts on the occupants not located or too injured to move. Indeed, two-way communications may be established with any occupant to further ensure discovery and safety.

Figure 5:
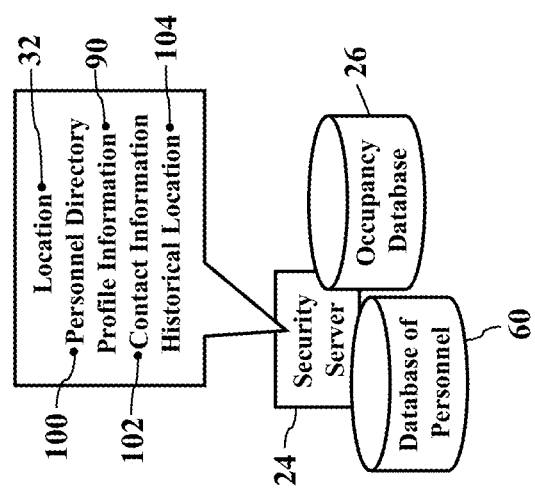

FIG. 5 illustrates a personnel directory 100. Even though FIGS. 1-4 illustrate emergency services, the occupancy database 26 may be utilized for more general, everyday operations. For example, each occupant's current location 32, as tracked by the occupancy database 26, may be added as an entry to the personnel directory 100. As the reader may understand, many organizations maintain and even publish a paper or electronic directory listing of employees, contractors, and other personnel. Exemplary embodiments may thus keep the personnel directory 100 updated with the current location 32 of each organizational member. Here, though, the personnel directory 100 preferably lacks at least some of the personal profile information 90. Most personnel do not want their social security number, physical/mental concerns and abilities, and emergency contacts revealed to others. Even though the database 60 of personnel may contain a rich profile of each person, the personnel directory 100 usually only provides limited contact information 102. The security server 24 may thus electronically copy the entry detailing the current location 32 in the occupancy database 26 to another database entry in the personnel directory 100. The personnel directory 100 may thus contain electronic entries detailing each employee's, contractor's, or other person's contact information 102 and their current location 32, as determined by their smartphone 52 or other mobile wireless device. The smartphone 52, for example, may store a software application that provides functionality for an electronic security badge that ensures tracking of the occupant's movements.

Exemplary embodiments thus reveal real time location information. Conventional employee directories are stale and static, failing to reveal dynamic information. Indeed, most directories may only list a particular building, room, and/or department, which is often meaningless in today's mobile communications environment. The personnel directory 100 thus makes each person's current location 32 available to all, further fostering collaboration as activities change during the day.

The personnel directory 100 is thus automatically updated. Each employee's, contractor's, or other person's current location 32 may thus be logged, even if not currently working in the building 22. Indeed, exemplary embodiments may even generate a historical location 104, based on historical location information logged over time. Some employees may have a desk or office and, yet, spend much working time in a lab or field environment. The personnel directory 100 may thus be electronically published to include both the current location 32 and the historical location 104, which may differ at different times of day or day of week. Again, tracking both the current location 32 and the historical location 104 promotes face-to-face collaboration and spawns innovation.

Figure 6:
FIGS. 6-7 illustrate wireless detection, according to exemplary embodiments.
Figure 7:
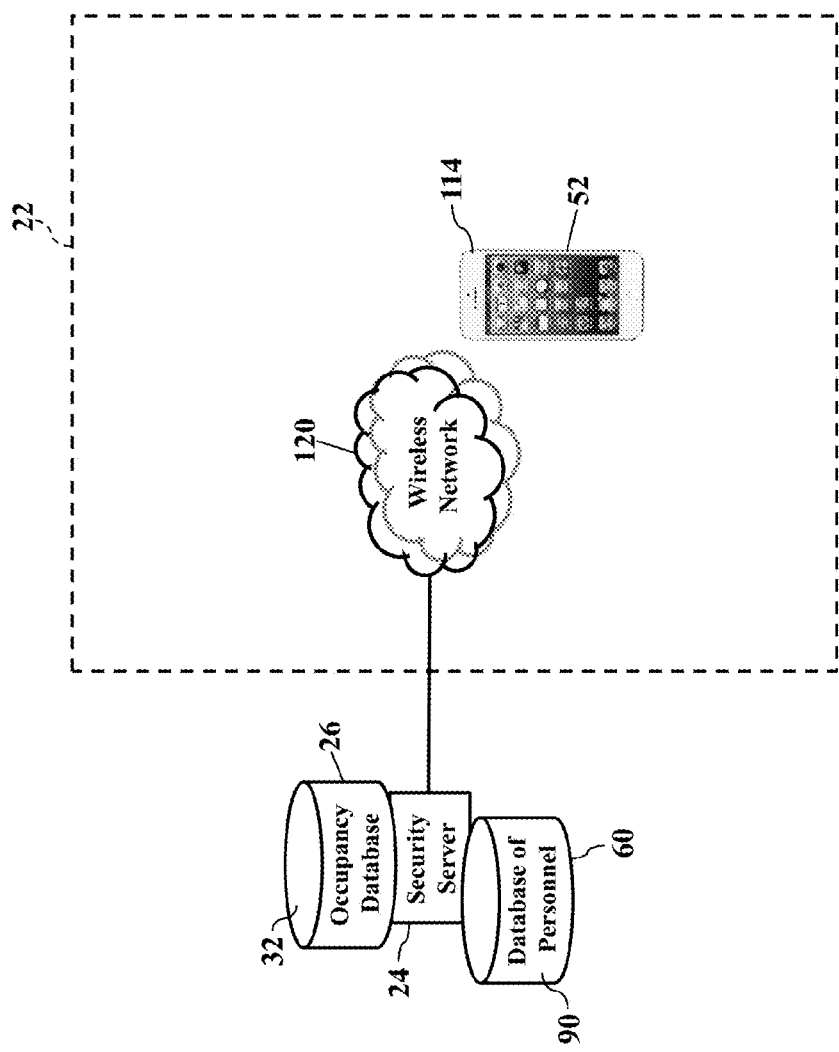

FIGS. 6-7 illustrate wireless detection, according to exemplary embodiments. Exemplary embodiments track the occupants of the building 22, based on wireless detection of their mobile devices. FIG. 6 thus illustrates a human user 110 in a lobby 112 of the building 22. The human user 110 may work within the building 22, or the human user 110 may be visiting someone within the building 22. The human user 110, in short, may be an employee, a visitor, a contractor, a tenant, or a guest requesting entry into the building 22. For simplicity, the human user 110 will mainly be described as an occupant 110. When the occupant 110 nears or enters the building 22, exemplary embodiments detect the wireless presence of the occupant's mobile device 114, such as her smartphone 52. That is, if the occupant's smartphone 52 is recognized, then exemplary embodiments may permit the human occupant 110 to enter more secure areas within the building 22. However, if the occupant's smartphone 52 is unrecognized, then exemplary embodiments may require more authentication credentials or additional measures. Exemplary embodiments, for example, may "push" electronic notifications to the occupant's smartphone 52, thus forcing the occupant to further authenticate.

FIG. 7 illustrates wireless presence. When the occupant enters any area of the building 22, the occupant's smartphone 52 may attempt to access a wireless network 120 serving the area. As the reader likely understands, many people carry a smartphone or other wireless device 114 that interfaces with wireless networks. So, when the occupant's smartphone 52 operates within any area of the building 22, the smartphone 52 may establish wireless communication with the wireless network 120. The smartphone 52, for example, may request access or permission to a wireless local area network (such as WI-FI®) serving a floor, room, or any other area.

Databases may be updated. Once the wireless network 120 detects the radio presence of the occupant's smartphone 52, the security server 24 may determine the current location 32 associated with the occupant's smartphone 52. The security server 24 may then log the current location 32 in the occupancy database 26. The security server 24 may also consult the database 60 of personnel and retrieve the profile information 90 that is associated with the occupant's smartphone 52. Exemplary embodiments may thus authorize and monitor the occupant, based on her smartphone 52.

Exemplary embodiments thus monitor the locations of wireless devices in the building 22. Wireless detection of any mobile device may thus be used to authorize entry and to track movements. Even though FIGS. 6-7 primarily illustrate the occupant's smartphone 52, exemplary embodiments may utilize any wired or wireless device (as later paragraphs will explain). Indeed, badges, watches, and other wearable smart devices may be wirelessly tracked throughout the building 22.

Figure 8:
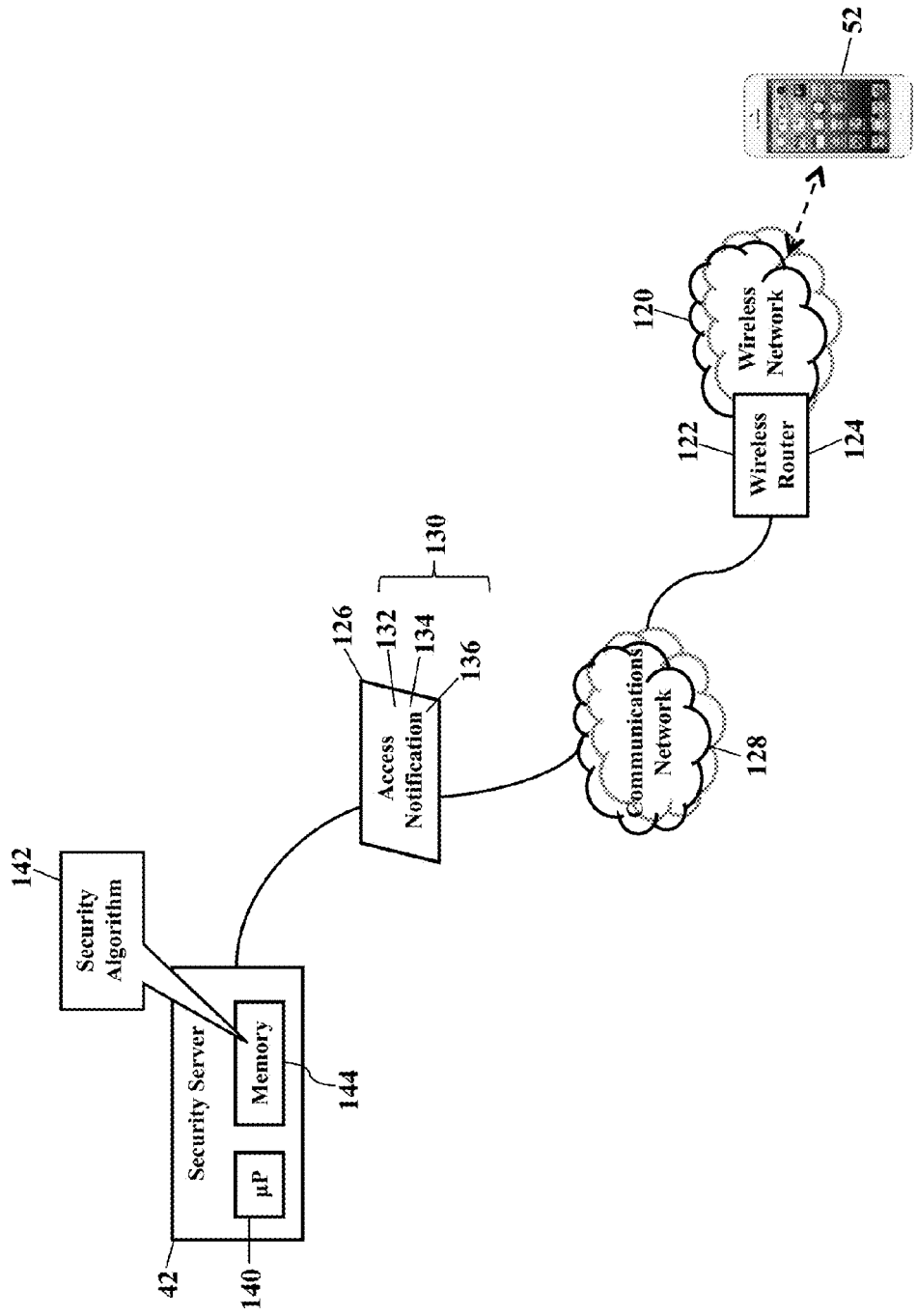
FIG. 8 is a more detailed illustration of the operating environment, according to exemplary embodiments.

FIG. 8 is a more detailed illustration of the operating environment, according to exemplary embodiments. FIG. 8 illustrates presence detection of the occupant's smartphone 52. When the smartphone 52 enters any area, the smartphone 52 may establish wireless communication with the wireless network 120 serving the area. The smartphone 52, for example, may request access or permission to a wireless local area network (such as WI-FI®), wide area cellular network, or any other network. The wireless network 120 may only recognize, or transmit/receive, using a particular frequency or band. The smartphone 52 may thus instruct its transceiver (not shown for simplicity) to wirelessly request access permission using the electromagnetic frequency band, channel, or standard required by the wireless network 120.

The security server 24 may be notified. When the wireless network 120 detects the smartphone 52, exemplary embodiments may inform the security server 24. That is, the smartphone 52 may send an access request to an access device 122 serving the wireless network 120. FIG. 8 illustrates the access device 122 as a wireless router 124, which commonly serves many residential and business WI-FI® networks. However, the access device 122 may be any network interface to an access network, such as a gateway, cable modem, or DSL modem. Regardless, the smartphone 52 broadcasts an electronic request that seeks access permission to the wireless network 120. When the access device 122 receives the access request, the access device 122 may send a packetized access notification 126 into a communications network 128 for routing and delivery to a network address associated with the security server 24. The wireless router 124, for example, may store or execute code or programming that forces or commands the access notification 126 when any device attempts to access the wireless network 120. The access notification 126 may thus alert the security server 24 to the radio frequency presence of the occupant's smartphone 52. The access notification 126 may further include information that uniquely identifies the smartphone 52, such as data representing a cellular identifier 130. While any alphanumeric combination may uniquely identify the smartphone 52, FIG. 8 illustrates the smartphone's cellular telephone number (or "CTN") 132, International Mobile Subscriber Identity (or "IMSI") 134, or Mobile Station International Subscriber Directory Number ("MSISDN") 136. Whenever the mobile smartphone 52 sends messages or information, the smartphone 52 may include or self-report its CTN 132, IMSI 134, and/or MSISDN 136.

The security server 24 may authorize the smartphone 52. The security server 24 has a processor 140 (e.g., "µP"), application specific integrated circuit (ASIC), or other component that executes a security algorithm 142 stored in a local memory 144. The security algorithm 142 instructs the processor 140 to perform operations, such as receiving and processing information received from a network interface to the communications network 128. The information may be received as packets of data according to a packet protocol (such as any of the Internet Protocols). The packets of data contain bits or bytes of data describing the contents, or payload, of a message. A header of each packet of data may contain routing information identifying an origination address and/or a destination address. The security algorithm 142, for example, may instruct the processor 140 to inspect the packetized access notification 126 for the cellular identifier 130 of the occupant's smartphone 52 requesting access to the wireless network 120.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 9:
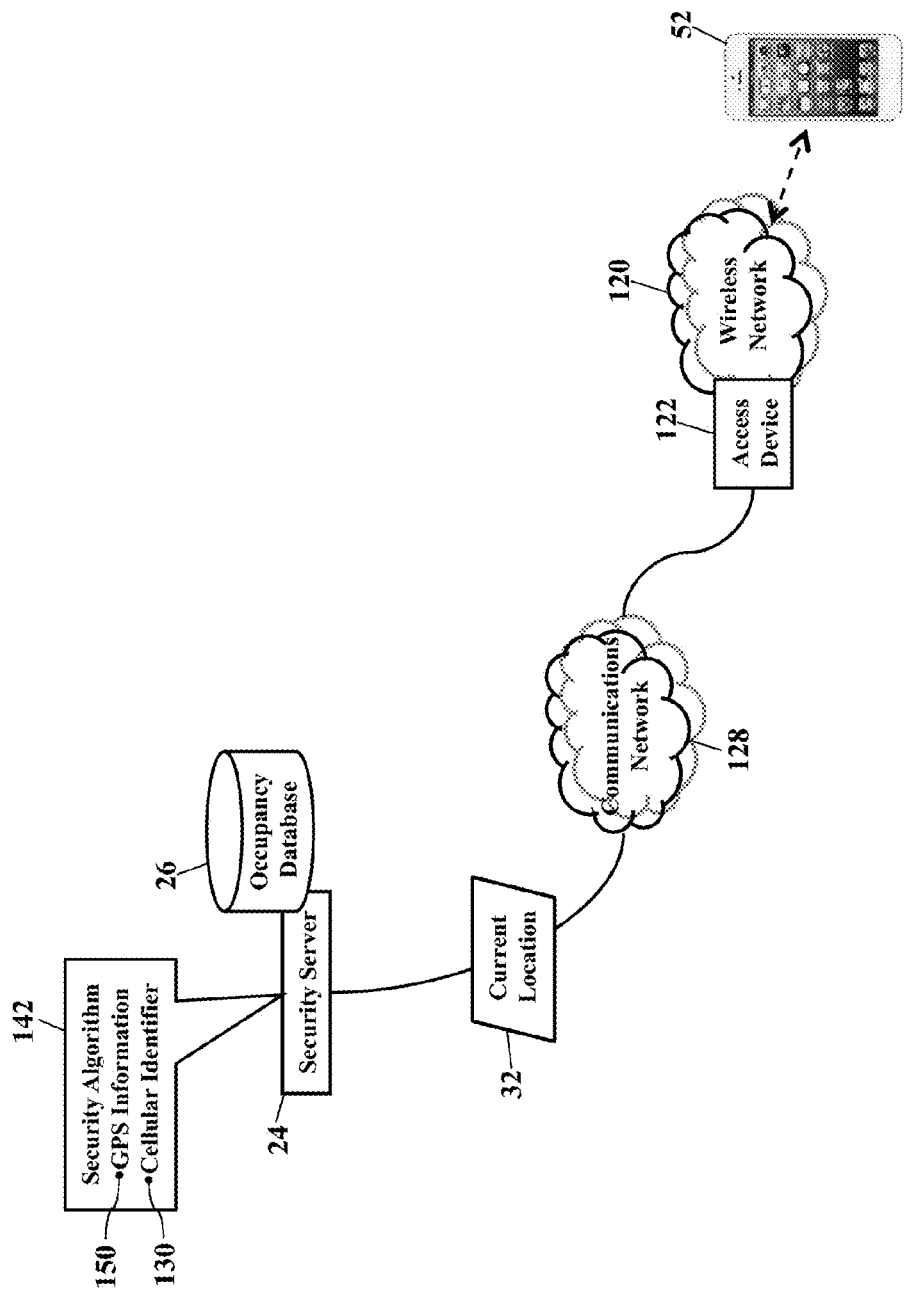
FIGS. 9-13 illustrate locational tracking, according to exemplary embodiments.

FIGS. 9-13 illustrate locational tracking, according to exemplary embodiments. Once the smartphone 52 is wirelessly detected, exemplary embodiments may log the movements for analysis. FIG. 9, for example, illustrates global positioning system ("GPS") tracking. As the reader may understand, the smartphone 52 may randomly or periodically report its current location 32 as global positioning system information 150. FIG. 9 illustrates the smartphone 52 reporting its current location 32 into the wireless WI-FI® network 120, which the access device 122 may forward to the security server 24. The current location 32, however, may be routed into a cellular network for delivery to the network address associated with the security server 24. Regardless, when the security server 24 receives the current location 32, the security server 24 also receives the cellular identifier 130 associated with the smartphone 52. The security algorithm 142 may thus cause the security server 24 to add or update the occupancy database 26 with the current location 32. The security server 24 may thus add an electronic database association between the cellular identifier 130 and the global positioning system information 150 reported by the smartphone 52.

Figure 10:
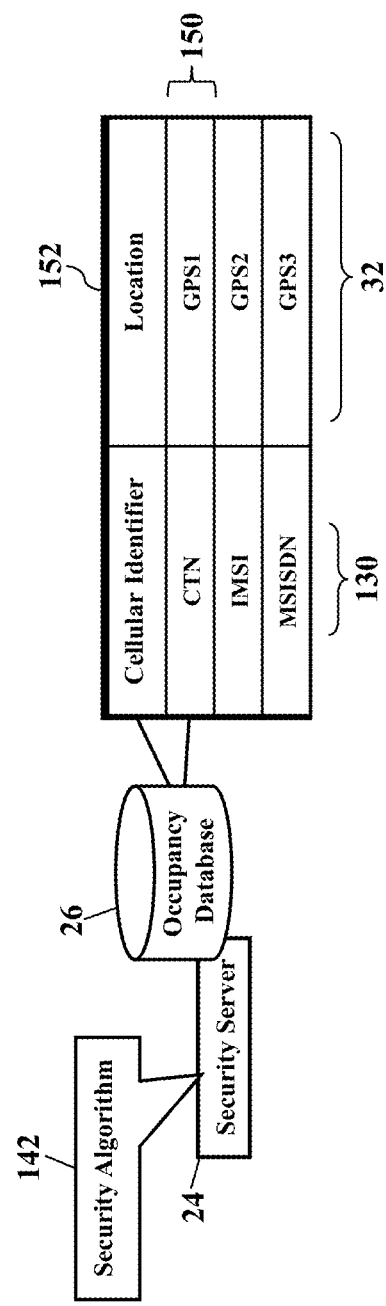

FIG. 10 further illustrates the occupancy database 26. The occupancy database 26 logs the locations 32 reported by occupant's smartphone 52. FIG. 10 illustrates the occupancy database 26 as a table 152 that electronically maps, relates, or associates different current locations 32 to the cellular identifier 130 of the occupant's smartphone 52. The smartphone 52, though, may be additionally or alternatively uniquely identified by a network address, a manufacturer's serial number, or any other alphanumeric combination. The occupancy database 26 is illustrated as being locally stored in the memory 144 of the security server 24, but some or all of the electronic database entries may be remotely maintained at some other server or location in the communications network (illustrated as reference numeral 128 in FIG. 8). Although FIG. 10 only illustrates a few entries, in practice the occupancy database 26 may contain many entries that richly detail the movements of the smartphone 52.

Figure 11:
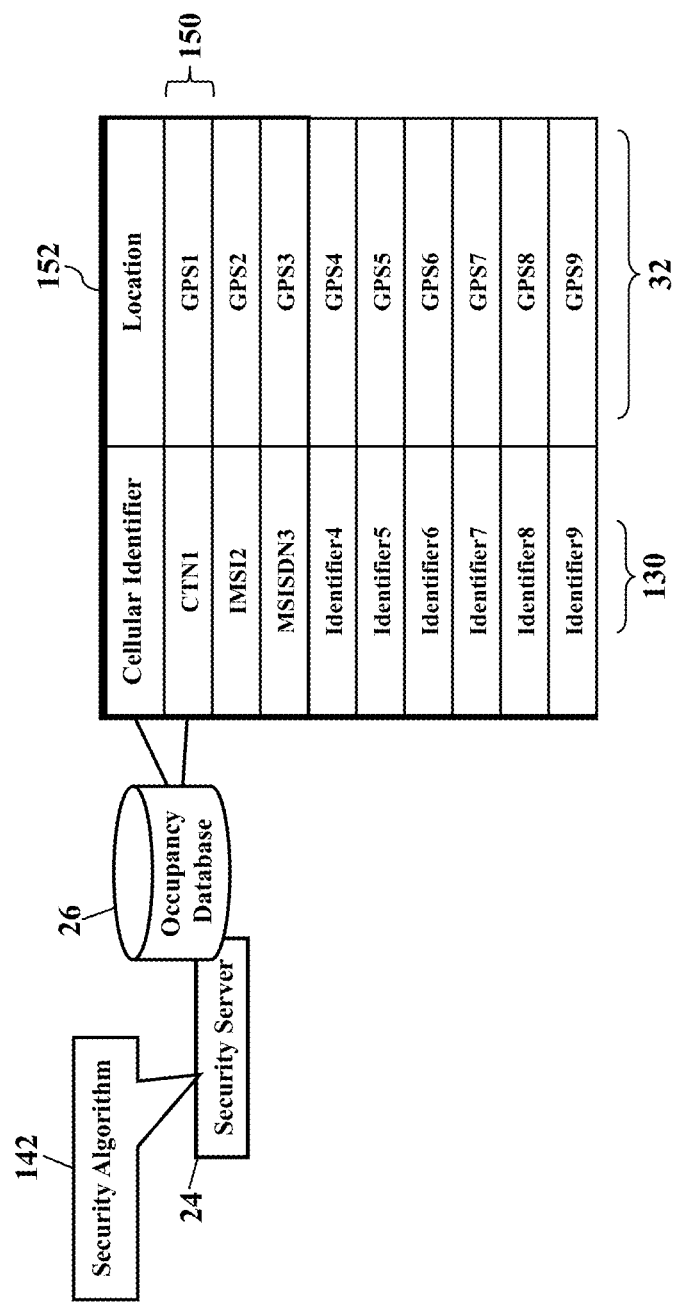

FIG. 11 illustrates network-wide tracking. As the reader may envision, the occupancy database 26 may be expanded to track the movements of many wireless devices. As employees, contractors, and visitors come and go, the occupancy database 26 may monitor the locations 32 reported by many different wireless devices. FIG. 11 thus illustrates several entries that associate different cellular identifiers 130 to their corresponding locations 32. While FIG. 11 only illustrates several entries, in practice the occupancy database 26 may contain many entries that richly detail the movements of hundreds or thousands of mobile devices.

Figure 12:
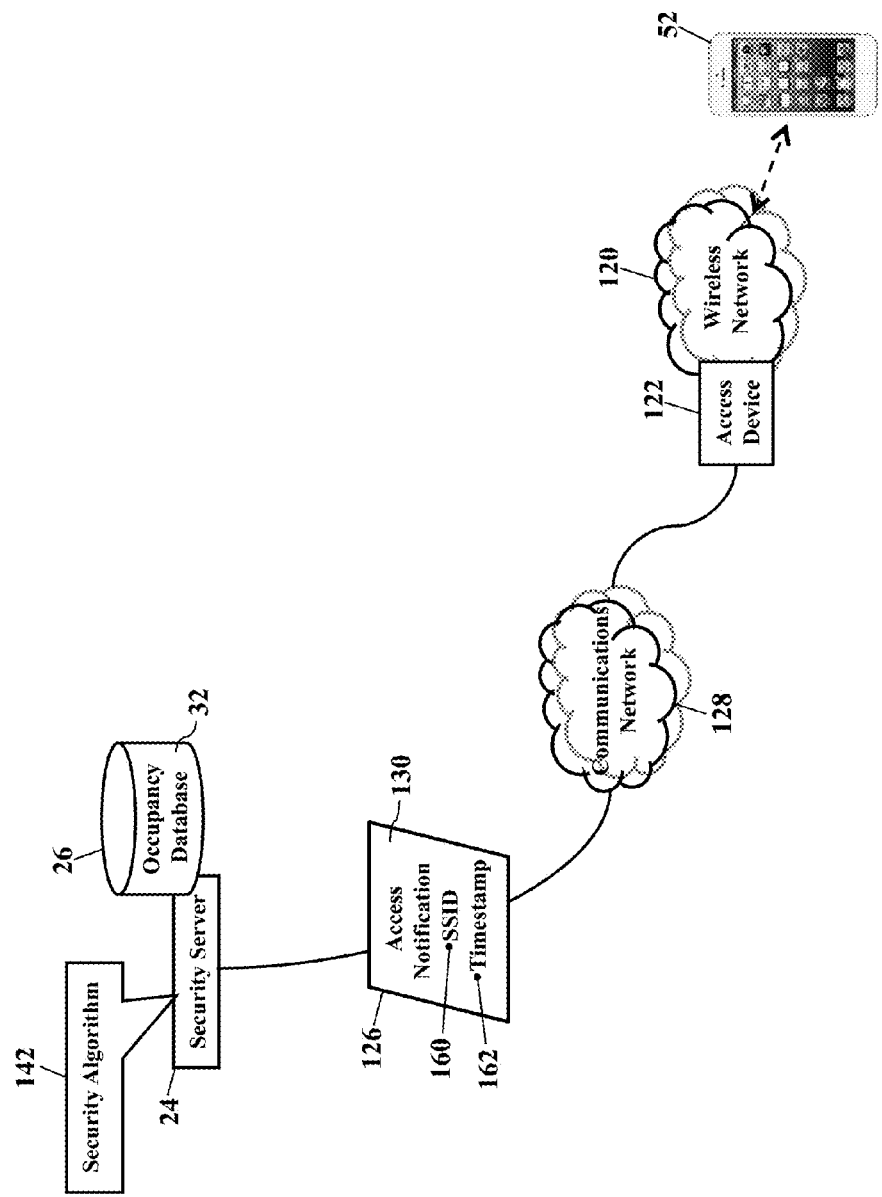
Figure 13:
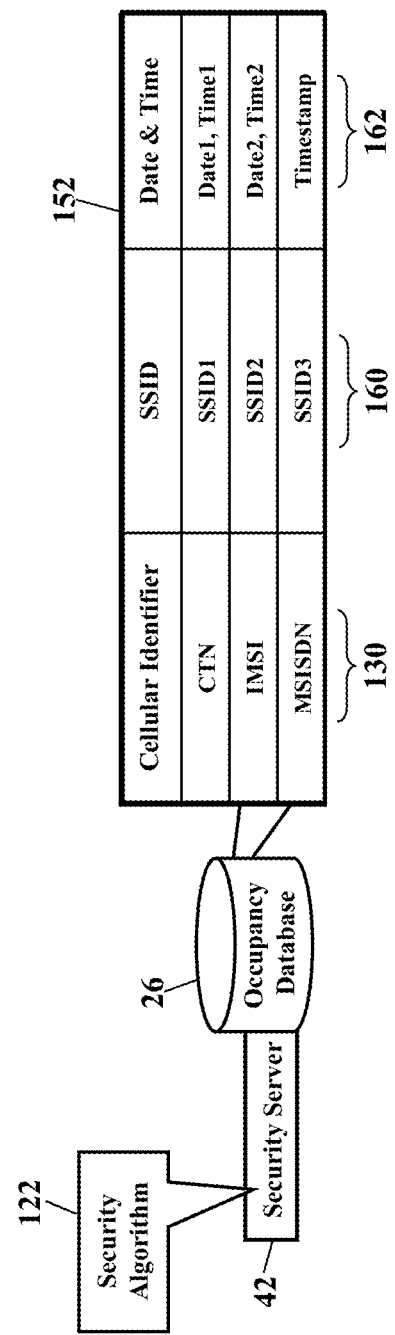

FIGS. 12-13 illustrate network tracking. Here exemplary embodiments may use network recognition to track the current location 32 of the occupant's smartphone 52. As the reader may understand, GPS signals are sometimes not received, especially when the smartphone 52 operates in an in indoor environment. Moreover, other users may disable GPS location services for privacy concerns. Whatever the reason, GPS signals may not be available or receivable. Exemplary embodiments, then, may additionally or alternatively track the current location 32 of the occupant's smartphone 52 using network identifiers. For example, as the occupant carries the smartphone 52, the smartphone 52 may wirelessly encounter different wireless local area networks (e.g., WI-FI®) serving the different floors, hallways, and/or rooms within the building. The occupant's smartphone 52 may also detect other identifiers of other networks (such as different cellular network cells). Regardless, the smartphone 52 may thus request access permission to each wireless network 120. FIG. 12 thus illustrates the current location 32 represented as a service set identifier (or "SSID") 160 that uniquely identifies a WI-FI® network currently proving wireless service to the smartphone 52. The SSID 160 may be self-reported by the smartphone 52, or the SSID 160 may be reported to the security server 24 (perhaps using the access notification 126 send from the access device 122, as explained with reference to FIG. 8). The access notification 126 may have a timestamp 162 that marks a time of requested access to the wireless network 120. Regardless, when the security server 24 receives the SSID 160, the security server 24 also receives the cellular identifier 130 associated with the smartphone 52. As FIG. 13 illustrates, the security algorithm 142 may thus cause the security server 24 to add or update the occupancy database 26 with the SSID 160. The security server 24 may thus add an electronic database association between the SSID 160, the cellular identifier 130 reported by the smartphone 52, and the timestamp 162.

Exemplary embodiments thus present an elegant solution. In today's mobile environment, people may be uniquely identified by their mobile devices (such as the smartphone 52). Employees, tenants, and visitors may thus be personally identified merely by carrying their smartphones. The occupancy database 26 thus contains entries that uniquely identify the wireless devices associated with the occupants. As any wireless device requests network access, the occupancy database 26 logs the corresponding current location 32. At any time, then, the occupancy database 26 provides a real time view of the current locations 32 of the occupants, as determined by tracking of their wireless devices.

Figure 14:
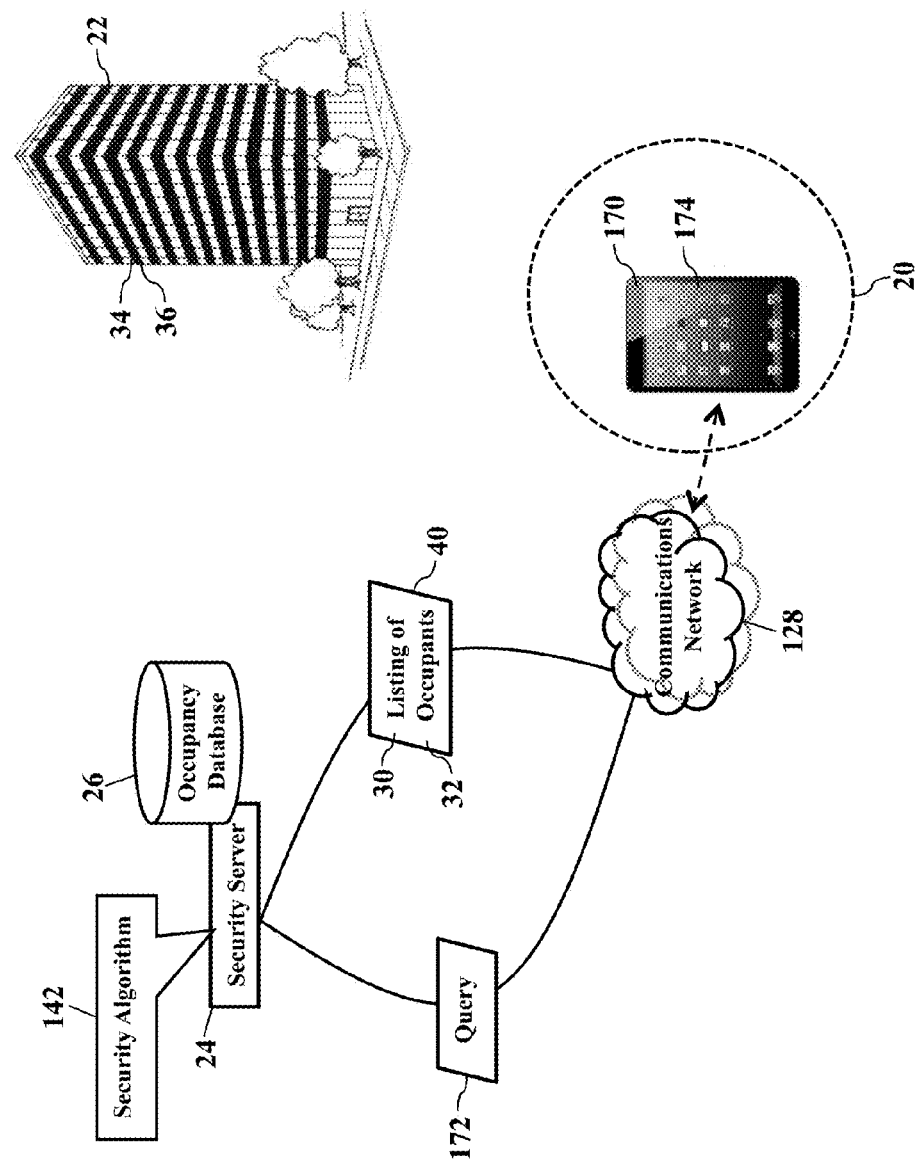
FIGS. 14-15 illustrate a listing of occupants, according to exemplary embodiments.
Figure 15:
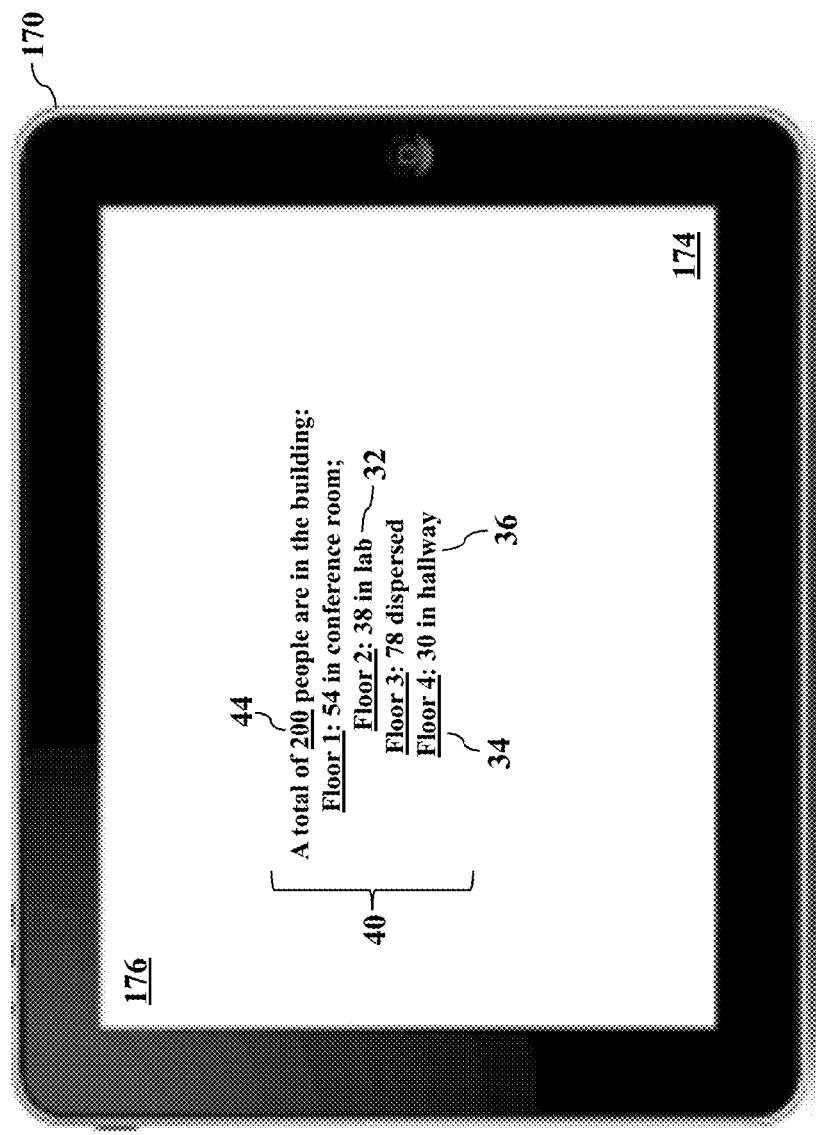

FIGS. 14-15 further illustrate the listing 40 of occupants, according to exemplary embodiments. As this disclosure explained, the first responders 20 may remotely access the security server 24. Assume any of the first responders 20 also carries a mobile device, such as a tablet computer 170. Whenever a first responder 20 needs to learn the occupancy of the building, the first responder's smartphone 52 may send a query 172. The query 172 may route into and along the communications network 128 to the network address associated with the security server 24. The query 172 requests the listing 40 of occupants associated with the building 22. For example, the query 172 may specify a physical/postal street address ("123 Main St.") or building name ("Rockefeller Center") as a search term. The security server 24 thus queries the occupancy database 26 for the search term and retrieves the listing 40 of occupants matching the search term. The security server 24 thus sends the listing 40 of occupants as a query response to some destination, such as the network address associated with the first responder's tablet computer 170. When the first responder's tablet computer 170 receives the listing 40 of occupants, the first responder's tablet computer 170 may process the listing 40 of occupants for display, such as on its display device 174. The listing 40 of occupants lists the name 30 and the current location 32 of each occupant within the building 22, as reported by their respective wireless devices. The current location 32 may even be pinpointed to the vertical floor 34 and the horizontal position 36. The first responders 20 may thus concentrate their rescue efforts on the current locations 32 of the occupants.

FIG. 15 further illustrates the listing 40 of occupants. Here the tablet computer 170 processes the listing 40 of occupants for display as a graphical user interface 176. When the security server 24 queries the occupancy database 26 (as FIG. 14 illustrated), the security server 24 may also tally or sum the total count 44 of the occupants currently located within the building 22, even grouped or determined by the vertical floor 34 and their horizontal position 36. The listing 40 of occupants may thus identify the occupants in a cafeteria or meeting room, according to their current location 32. The occupants having the same or similar current location 32 may be grouped together, perhaps to aid rescue efforts. The listing 40 of occupants may further include graphical controls and/or website links that further display the names and images of the occupants (as explained with reference to FIG. 1).

Figure 16:
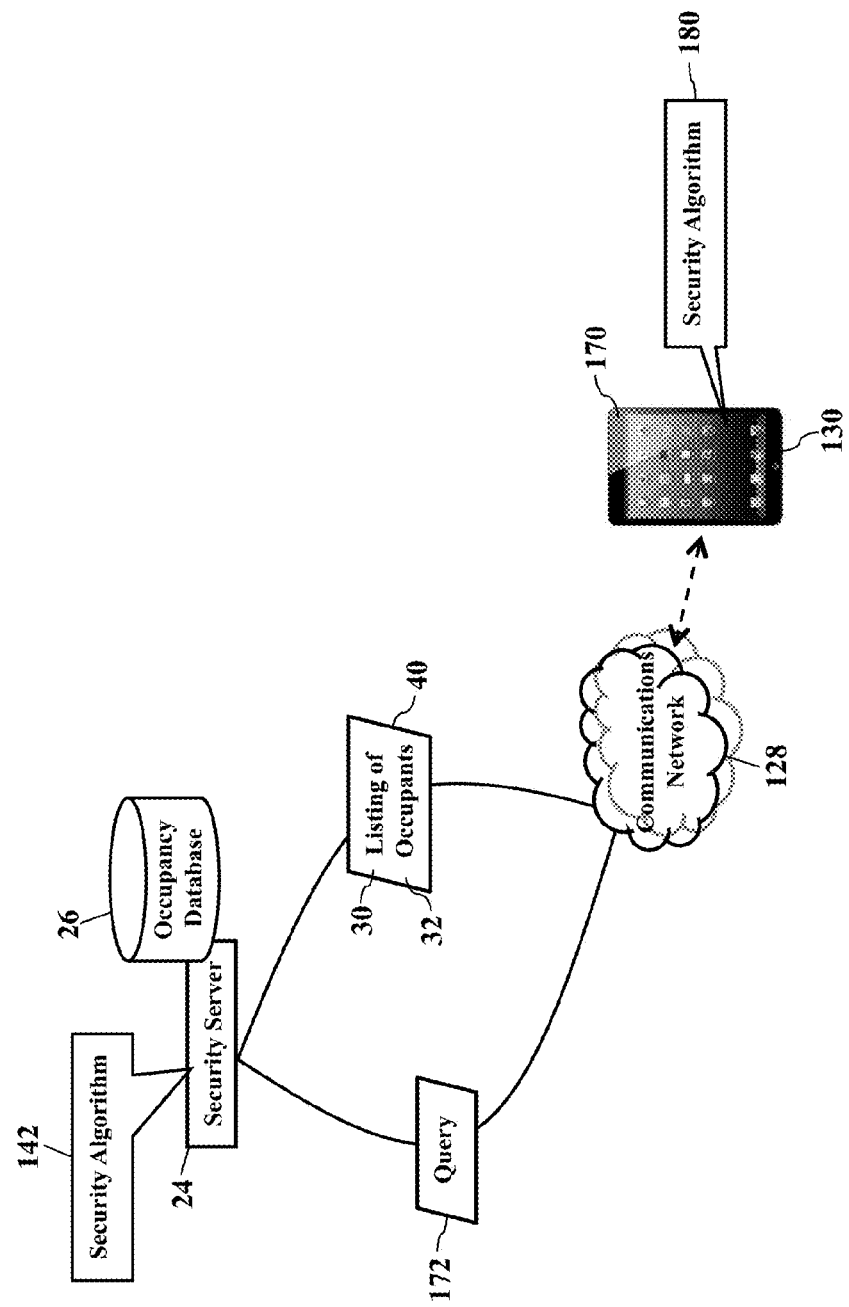
FIG. 16 is an illustration of responder credentials, according to exemplary embodiments.

FIG. 16 is an illustration of responder credentials, according to exemplary embodiments. As the reader may understand, the occupancy database 26 may be restricted in accessibility. That is, only authorized persons may retrieve the information logged in the occupancy database 26. Security measures may thus be implemented to avoid rogue access. FIG. 16, for example, illustrates a software application 180 that may be required for access. The software application 180 is downloaded to the first responder's mobile device, such as her tablet computer 170. The software application 180 contains specialized programming or code that authorizes or even allows access to the occupancy database 26. The security algorithm 142 may thus cooperate with, and even require, the software application 180 in order to access and query the occupancy database 26. Indeed, the inventors envision that only authorized personnel (such as police, fire, and other emergency services) would have downloadable access to the software application 180. Moreover, additional security features may also require identification of the first responder's tablet computer 170, such as its corresponding cellular identifier 130. If the software application 180 is downloaded to an approved list of cellular identifiers, then the first responder's tablet computer 170 may query for and retrieve the listing 40 of occupants.

Figure 17:
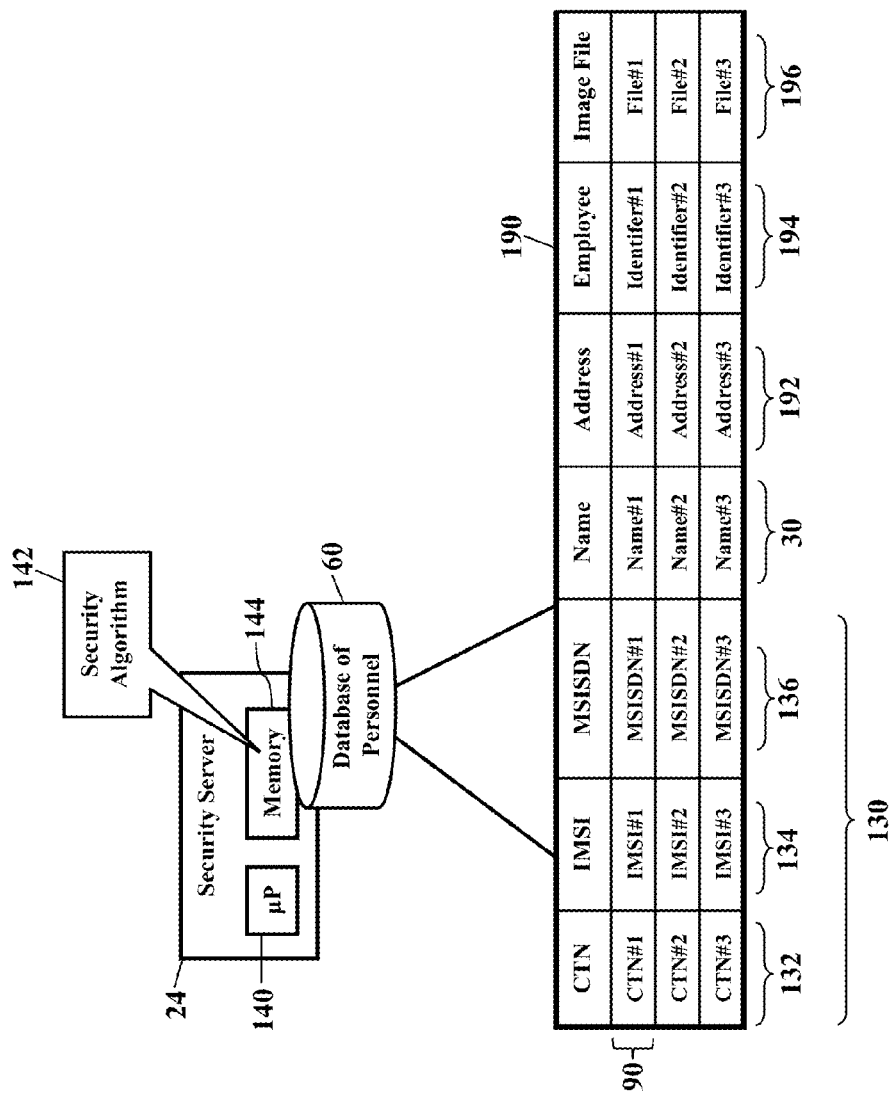
FIGS. 17-18 illustrate a database of personnel, according to exemplary embodiments.
Figure 18:
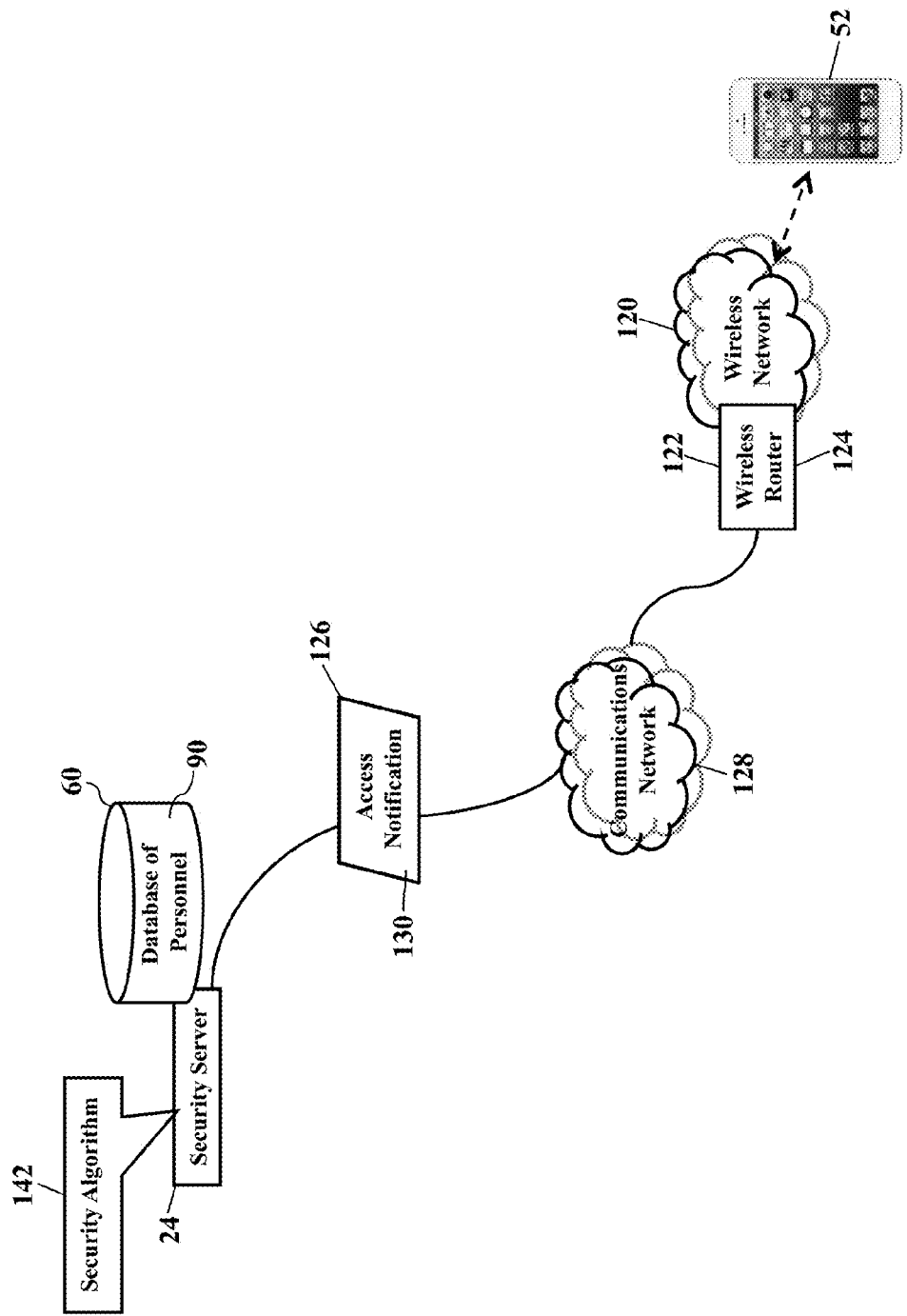

FIGS. 17-18 illustrate the database 60 of personnel, according to exemplary embodiments. As this disclosure briefly explained, the database 60 of personnel stores names, addresses, images, and/or other profile information 90 for employees, contractors, and other personnel. For simplicity the database 60 of personnel is illustrated as a table 190 that electronically maps, relates, or associates different personnel to their corresponding profile information 90. For example, an entry may associate each person's name 30, address 192, and/or employee number 194 to the cellular identifier 130 associated with the person's personal wireless device (such as the smartphone 52 illustrated in FIGS. 1-8). FIG. 17 illustrates the cellular identifier 130 as the cellular telephone number 132, the IMSI 134, and/or the MSISDN 136. Moreover, the database 60 of personnel may further associate a digital image file 196 to the cellular identifier 130, thus allowing retrieval, recognition, and/or analysis of a facial image. The database 60 of personnel is illustrated as being locally stored in the memory 144 of the security server 24, but some or all of the database entries may be remotely maintained at some other server or location in the communications network (illustrated as reference numeral 128 in FIG. 8). While FIG. 17 only illustrates a few entries, in practice the database 60 of personnel may contain many electronic entries for hundreds or thousands of people.

As FIG. 18 illustrates, the security server 24 may query the database 60 of personnel. When the security server 24 receives the access notification 126, the security algorithm 142 causes the security server 24 to query for entries that match the query search term(s) detailed or described in the electronic access notification 126. The query search term, for example, may be the cellular identifier 130 detailed in the access notification 126. If the database 60 of personnel contains a matching entry, then the security server 24 may retrieve the profile information 90 having an electronic database association with the cellular identifier 130.

Figure 19:
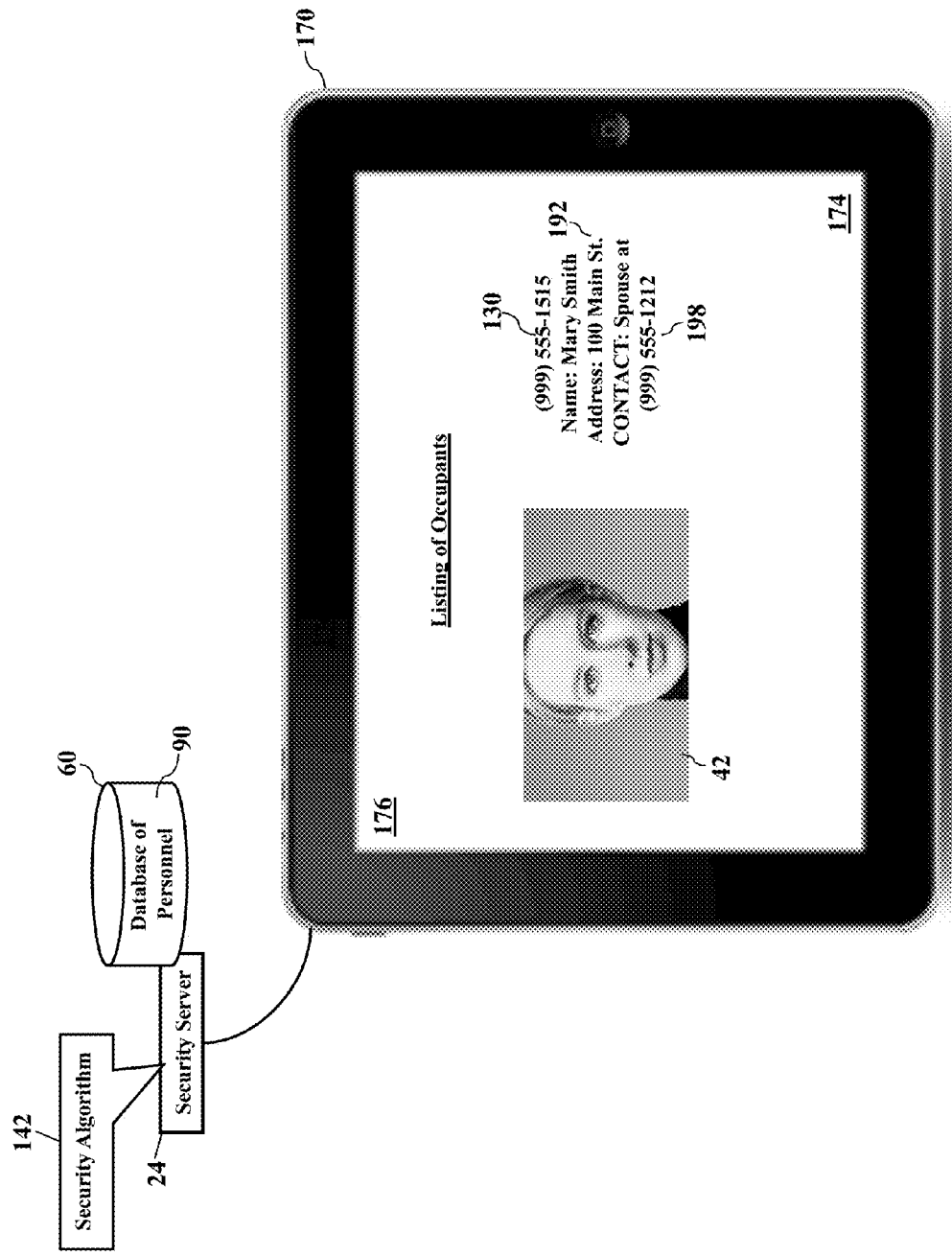
FIG. 19 further illustrates the listing of occupants, according to exemplary embodiments.

FIG. 19 further illustrates the listing 40 of occupants, according to exemplary embodiments. Here the listing 40 of occupants may be supplemented or augmented with database information retrieved from the database 60 of personnel. For example, the listing 40 of occupants may include the profile information 90 retrieved from the database 60 of personnel (as FIG. 18 illustrated). That is, once the cellular identifier 130 is known, the corresponding occupant's digital image file 196 of her facial image 42 may be incorporated into the listing 40 of occupants. The occupant's digital facial image 42 thus provides quicker visual recognition and confirmation. The listing 40 of occupants may also include the occupant's home address 192 and emergency contact information 198 to alert loved ones and neighbors. The profile information 90 may further include health information, medical concerns, medications, and any other information that could aid medical personnel in rendering care. Any profile information 90 desired may be incorporated into the listing 40 of occupants to aid the first responders.

Figure 20:
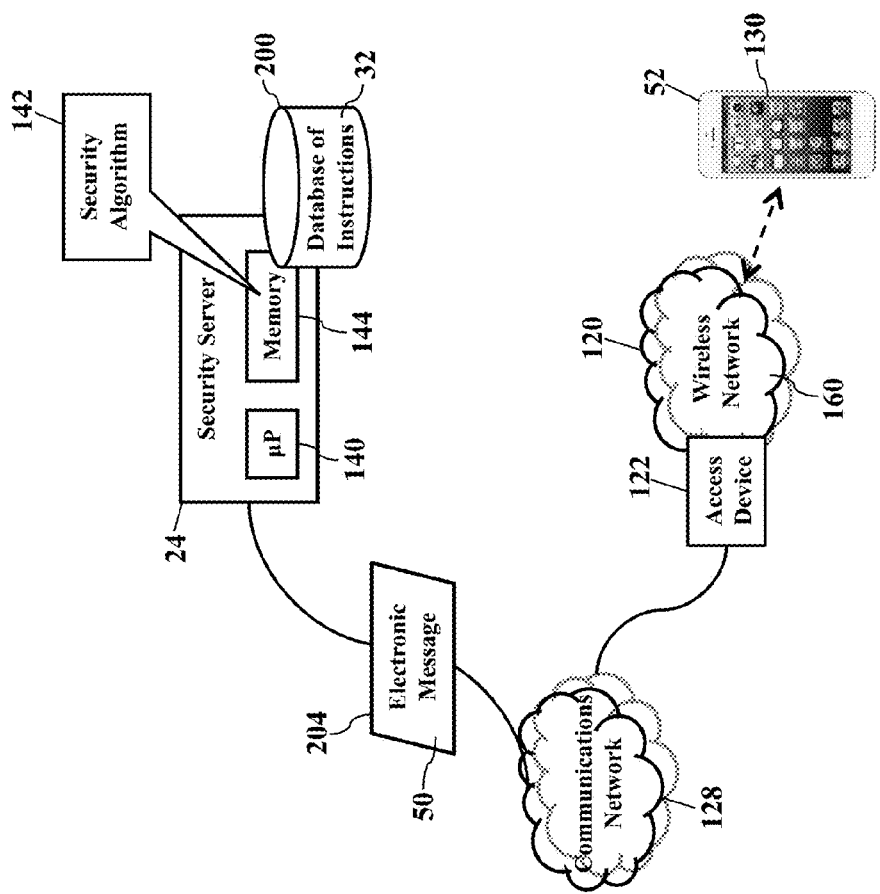
FIGS. 20-21 illustrate a personalized instruction, according to exemplary embodiments.
Figure 21:
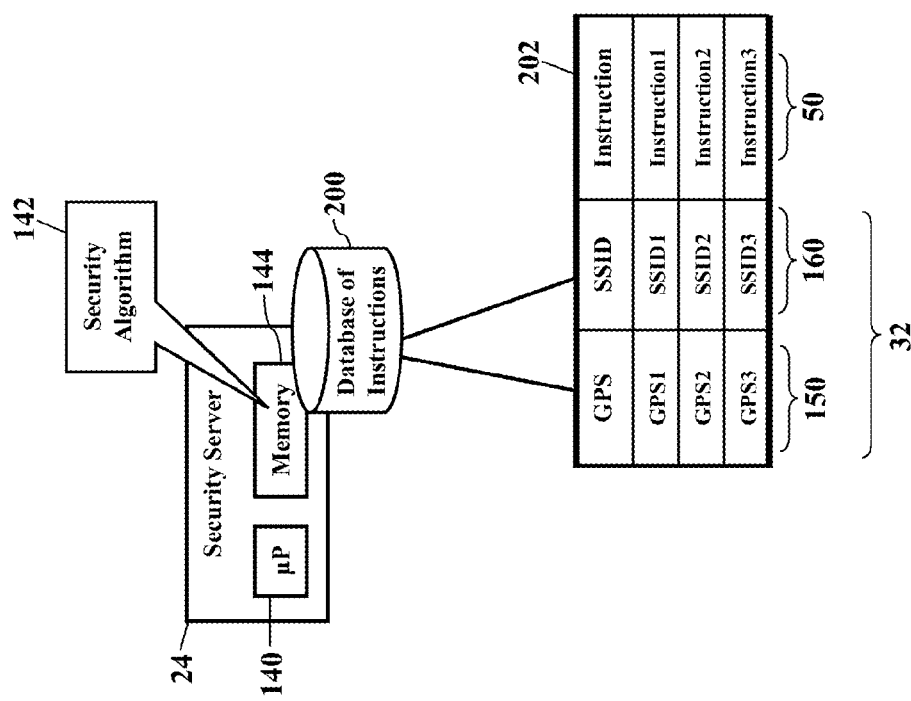

FIGS. 20-21 illustrate the personalized instruction 50, according to exemplary embodiments. Once the occupant's current location 32 is known, exemplary embodiments may send the personalized instruction 50. The personalized instruction 50 may be a call, text, email or other electronic communication that instructs the occupant (via her smartphone 52) to implement some action or plan during the crisis. An emergency responder may thus call or text specific instructions to ensure safety.

FIGS. 20-21, though, illustrate a database 200 of instructions. The database 200 of instructions stores one or more instructions 50 that are pre-configured for the occupant's current location 32, as reported by her smartphone 52. Once the security algorithm 142 determines the current location 32 of the occupant's smartphone 52, the security algorithm 142 may instruct the security server 24 to query the database 200 of instructions for the corresponding instruction 50. The current location 32, as earlier explained, may be represented as the global positioning system information 150 and/or the service set identifier ("SSID 160") that uniquely identifies the WI-FI® network currently proving wireless service to the occupant's smartphone 52. FIG. 20 illustrates the database 200 of instructions locally stored in the memory 144 of the security server 24, but some or all of the database entries may be remotely maintained at some other server or location in the communications network 128. FIG. 21 illustrates the database 200 of instructions as a table 202 that electronically maps, relates, or associates different instructions 50 to different locations 32. The security server 24 executes a database lookup and retrieves the corresponding instruction 50 that has been pre-configured or predetermined for the current location 32. Returning to FIG. 20, the security server 24 may then generate an electronic message 204 that incorporates the instruction 50 (perhaps as text). The security server 24 sends the electronic message 204 to the cellular identifier 130 or other network address associated with the occupant's smartphone 52.

Exemplary embodiments may thus include location-based instructions. As the occupant carries the mobile smartphone 52, exemplary embodiments track the movements of the occupant's smartphone 52. When an emergency situation occurs, the security server 24 may monitor the smartphone's current location 32 and retrieve the corresponding personalized instruction 50. The security server 24 may then electronically notify the occupant using the electronic message 204. For example, suppose the database 200 of instructions includes entries identifying locations of first aid kits. As the occupant approaches a first aid kit, the security server 24 may personally instruct the occupant to retrieve the first aid kit, based on the proximity of her smartphone 52. Likewise, the database 200 of instructions may also include the locations of fire extinguishers and defibrillators. Should any occupant move in proximity to one of the predetermined locations, the security server 24 may personally instruct the occupant to retrieve the emergency equipment, based on the proximity of her smartphone 52. Other occupants may be instructed to open or close doors and windows, again based on the proximity of their smartphones.

Figure 22:
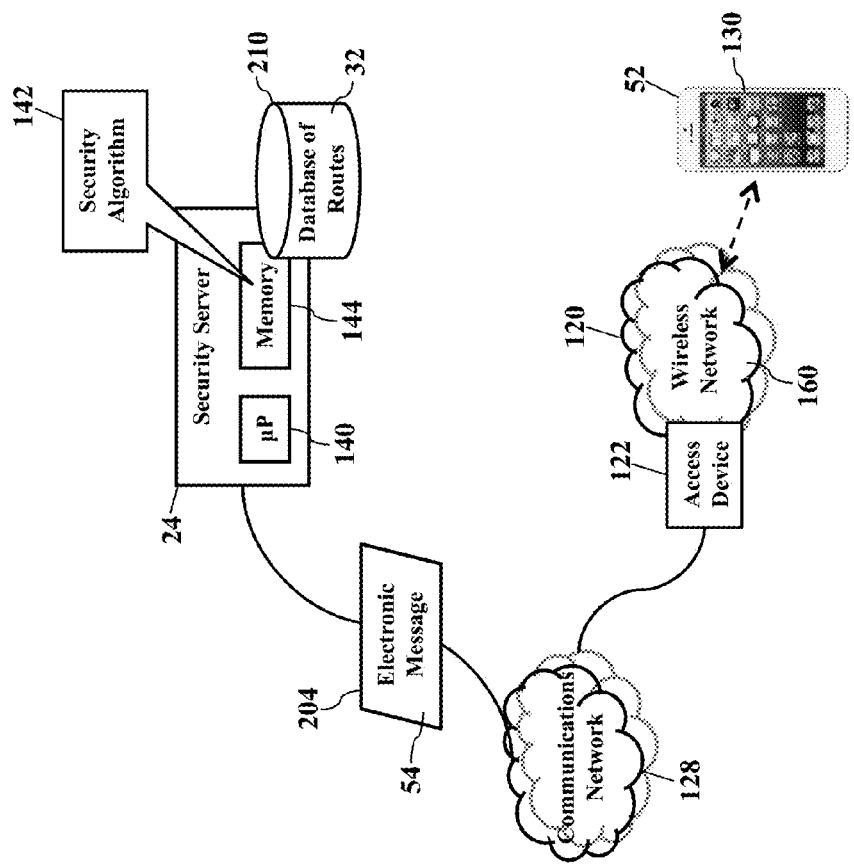
FIGS. 22-23 illustrate a personalized evacuation route, according to exemplary embodiments.
Figure 23:
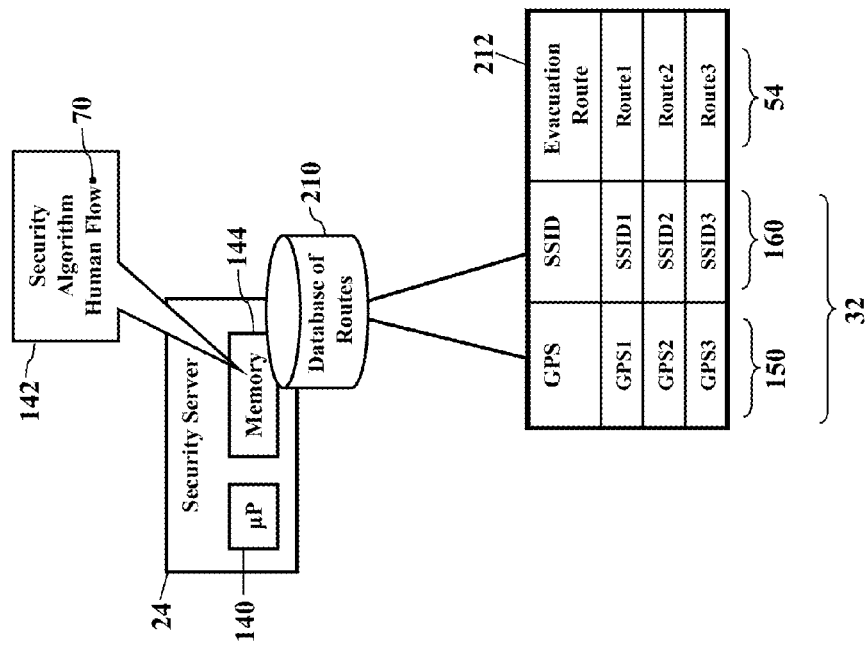

FIGS. 22-23 illustrate the personalized evacuation route 54, according to exemplary embodiments. Once the security algorithm 142 determines the current location 32 of the occupant's smartphone 52, the security algorithm 142 may instruct the security server 24 to query a database 210 of routes for the corresponding evacuation route 54. The database 210 stores one or more evacuation routes 54 that are pre-configured for the occupant's current location 32, as reported by her smartphone 52. Once the occupant's current location 32 is known, exemplary embodiments may retrieve and send the personalized evacuation route 54 to the occupant's smartphone 52. The current location 32, as earlier explained, may be represented as the global positioning system information 150 and/or the service set identifier ("SSID 160") that uniquely identifies the WI-FI® network currently proving wireless service to the occupant's smartphone 52. FIG. 22 illustrates the database 210 of routes locally stored in the memory 144 of the security server 24, but some or all of the database entries may be remotely maintained at some other server or location in the communications network 128. FIG. 23 illustrates the database 210 of routes as a table 212 that electronically maps, relates, or associates different evacuation routes 54 to different locations 32. The security server 24 executes a database lookup and retrieves the corresponding evacuation route 54 that has been pre-configured or predetermined for the current location 32. Returning to FIG. 22, the security server 24 may then generate the electronic message 204 that incorporates the evacuation route 54 (perhaps as text). The security server 24 sends the electronic message 204 to the cellular identifier 130 or other network address associated with the occupant's smartphone 52.

Exemplary embodiments may thus include location-based routings. During an emergency situation, the security server 24 may monitor the smartphone's current location 32 and retrieve the corresponding evacuation route 54 that is pre-configured for the smartphone's current location 32. The database 210 of routes may thus have entries identifying paths along corridors and stairwells that are pre-approved for emergency uses. Paths may be predetermined based on distance and or time, as some paths may be quicker from different locations. Other paths may be predetermined based on safety concerns, as some paths may have easier ingress and egress. The predetermined evacuation routes 54, of course, will vary greatly depending on building design, floor layout, and even furniture interior decorating.

Exemplary embodiments thus help alleviate panic. In most emergency situations the occupants fend for themselves. Here, though, emergency plans may be developed in advance and planned according to each individual, based on the current location 32. Routes 54 may be chosen to ensure efficient and maximum movement to safety, especially considering the human flow 70 along the corridors of the facility. Groups of occupants may be directed along one route, while a different group of occupants may be directed along a different route, even if the groups have similar locations. Indeed, the human flow 70 (e.g., the count of devices per unit of time requesting wireless access to the access device 122) can provide a quick and accurate measure of capacity along hallways and other corridors. Occupants may thus be lead to safe gathering points, whether inside a room or exterior of the building.

Figure 24:
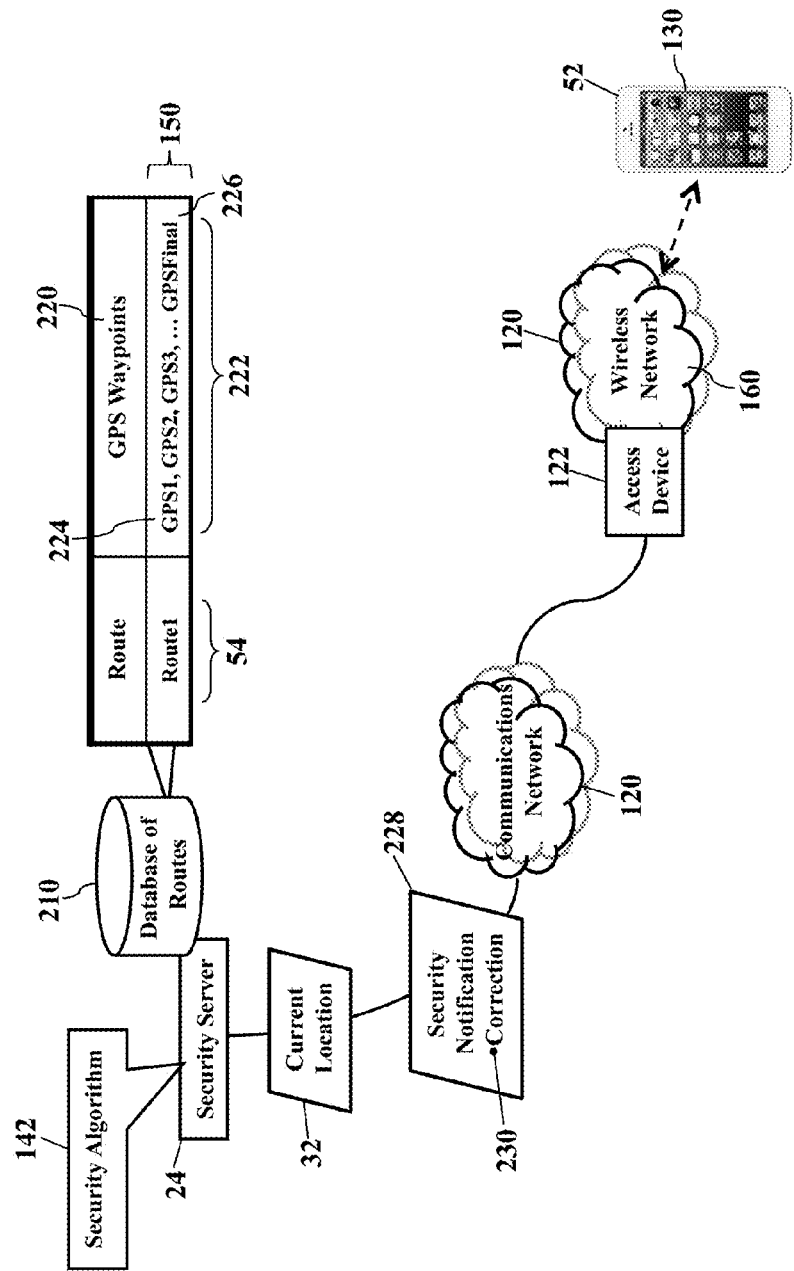
FIGS. 24-26 illustrate waypoints, according to exemplary embodiments.
Figure 25:
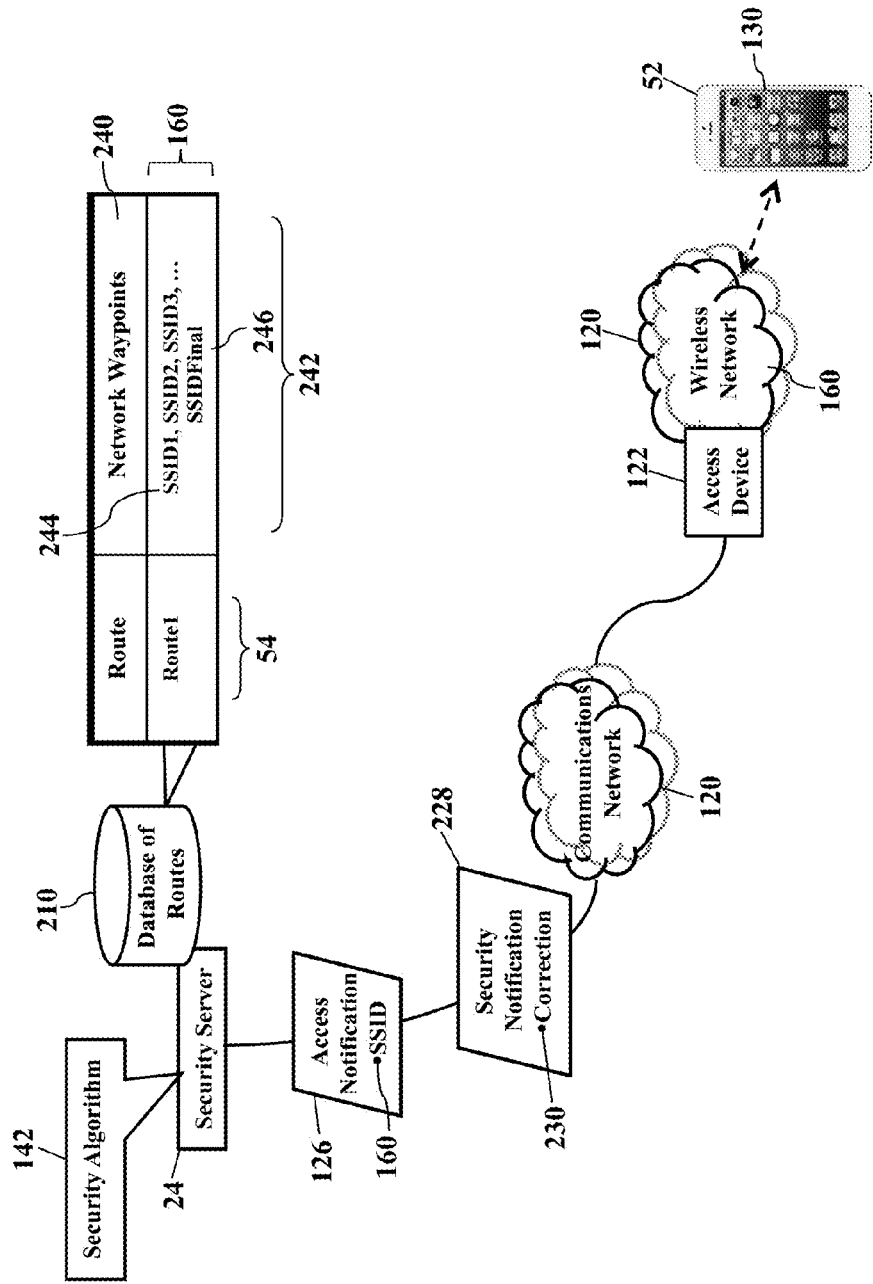
Figure 26:
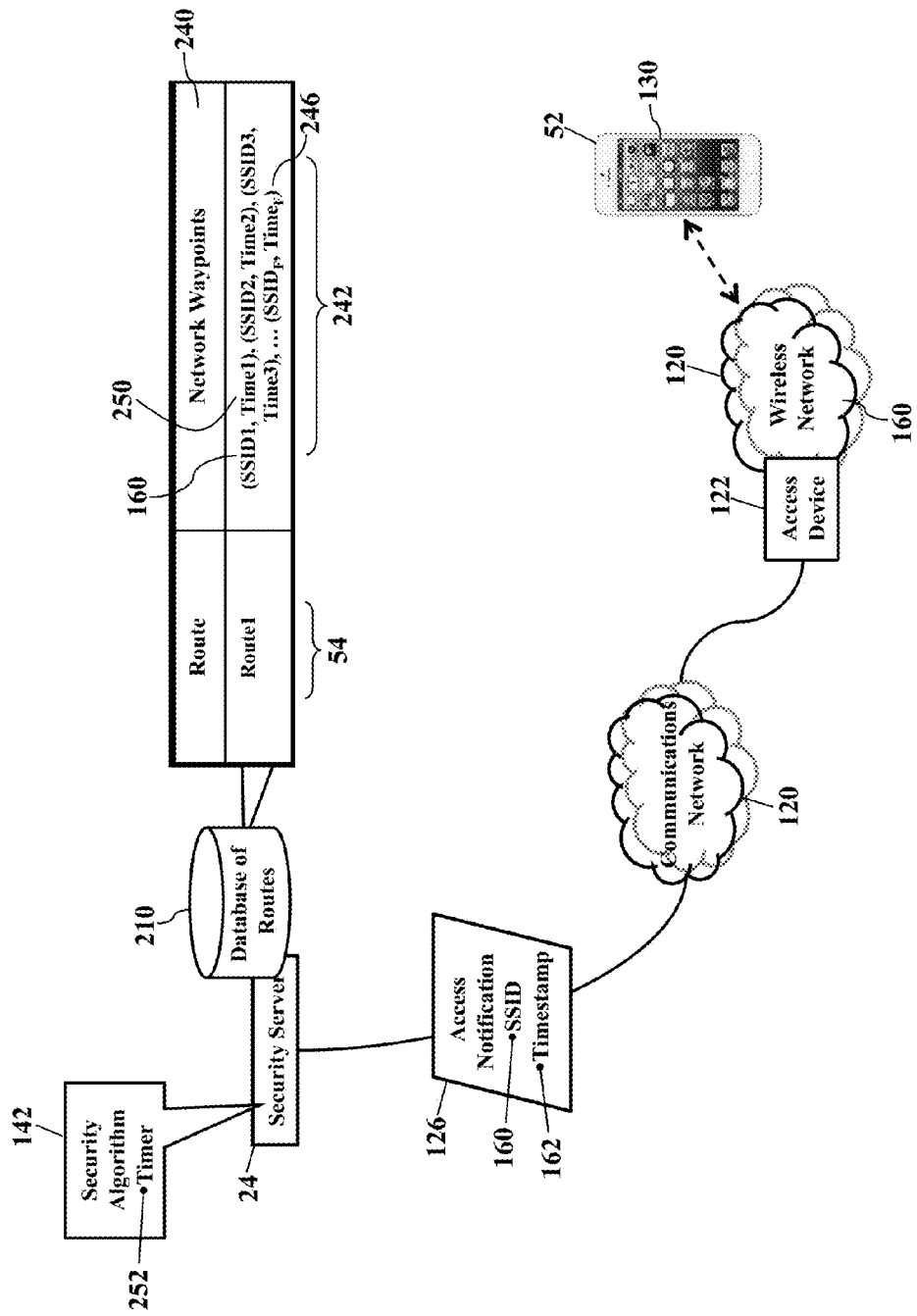

FIGS. 24-26 illustrate waypoints, according to exemplary embodiments. Once the predetermined evacuation route 54 is retrieved, the occupant should walk or ride along the evacuation route 54 to a predetermined safe destination. If the occupant strays from the evacuation route 54, the occupant may be endangering him and others. Exemplary embodiments, then, may track the occupant's position or progress along the predetermined evacuation route 54. FIG. 24 thus illustrates GPS waypoints 220 along which the smartphone 52 may or must report. That is, the predetermined evacuation route 54 may be defined as a series 222 of global positioning system information 150 from an initial GPS coordinate 224 to a final GPS coordinate 226. As the occupant walks the corridors of the building, the occupant's smartphone 52 may continually, periodically, and/or randomly report its current location 32. FIG. 24 illustrates the smartphone 52 reporting its current location 32 into the wireless network 120, which the access device 122 may forward to the security server 24. The current location 32, however, may be routed into a cellular network for delivery to the network address associated with the security server 24. Regardless, when the security server 24 receives the current location 32, the security server 24 may compare the current location 32 to the GPS waypoints 220 associated with the evacuation route 54. If the current location 32 matches one of the GPS waypoints (perhaps within a locational tolerance), then the security algorithm 142 may conclude that the occupant's smartphone 52 is on track and proceeding as authorized. However, if the current location 32 reported by the occupant's smartphone 52 fails to match one or any of the GPS waypoints 220, the security algorithm 142 may generate a security notification 228. The security notification 228 may be any electronic message that warns the occupant to resume the predetermined evacuation route 54 to the safe destination, as represented by the final entry or GPS coordinate 226. The security notification 228 may route back to the access device 122 for transmission to the network address assigned to the smartphone 52. However, the security notification 228 may be a short message service (SMS) text message that is sent to the unique cellular identifier 130 of the visitor's smartphone 52. The security notification 228 may further include a correction 230 that puts the occupant back on the predetermined evacuation route 54 to the destination 226. Moreover, the security server 24 may also copy or forward the security notification 228 to a device associated with an emergency responder for nearly immediate human intervention.

FIG. 25 illustrates network waypoints 240. Here exemplary embodiments may define the predetermined evacuation route 54 as a series 242 of service set identifiers. Each individual service set identifier (or "SSID") 160 uniquely identifiers a different WI-FI® network serving some portion of the predetermined evacuation route 54 from an initial SSID 244 to a final SSID 246 at the safe destination. For example, as the occupant's smartphone 52 moves along the predetermined evacuation route 54, the security server 24 may receive a series of the access notifications 126 identifying the corresponding SSID 160. The security server 24 may thus compare the SSID 160 to the network waypoints 240 associated with the predetermined evacuation route 54. If the current SSID 160 matches one of the network waypoints 240, then the security algorithm 142 may conclude that the occupant's smartphone 52 is on track and proceeding as authorized. However, if the SSID 160 fails to match one or any of the network waypoints 240, the security algorithm 142 may generate the security notification 228 with the correction 230 (as earlier explained).

The waypoints may be strictly compared. As the occupant evacuates, the security server 24 receives sequential access notifications 126. The security server 24 may require a strict sequential match with the network waypoints 240. The occupant's smartphone 52, in other words, may be required to traverse the network waypoints 240 in sequential order, from the first entry SSID 244 to the final destination SSID 246 wirelessly serving the safe destination. If the smartphone 52 strays from the predetermined evacuation route 54, one of the access notifications 126 will identify an SSID 160 not matching the network waypoints 240 in the approved evacuation route 54. The smartphone 52, in other words, is requesting wireless access to an unauthorized network, perhaps revealing a dangerous detour. The security algorithm 142 may thus warn the occupant to resume the pre-configured evacuation route 54 (as earlier explained).

FIG. 26 illustrates timing requirements. Here each network waypoint 240 may also have a corresponding timing parameter 250. FIG. 26 thus illustrates each network waypoint 240 as an SSID/time pairing. That is, each network waypoint 240 may be a network/timing pair of values associated with each successive wireless network 160. As the occupant's smartphone 52 travels along the predetermined evacuation route 54, the security server 24 may monitor a speed or time of movement. Each access notification 126 may have the timestamp 162 that marks a time of requested access to the wireless network 160 (as identified by the SSID 160). As the security server 24 sequentially compares the SSID 160 to the network waypoints 240, the security server 24 may also require strict adherence to each corresponding timing parameter 250. The security server 24, in other words, may initialize a timer 252 with receipt of the access notification 126. The timer 252 counts up or down to a final value at a receipt of a next access notification 126 associated with the same occupant's smartphone 52 (e.g., the cellular identifier 130). The timer 252, for example, may thus count a time in seconds or minutes between successive access notifications 126 sent from different access devices 122 along the predetermined evacuation route 54. So, not only must each sequential SSID 160 match the network waypoints 240, but exemplary embodiments may also require timing compliance between the successive network waypoints 240. The security server 24 may thus compare a current value of the timer 252 to the timing parameter 250 associated with a next corresponding network waypoint 240 in the series 242. If the current value of the timer 252 is less than or equal to the timing parameter 250, then the security algorithm 142 may conclude that the occupant's smartphone 52 is on the approved evacuation route 54 and on track to arrive on time at the final safe destination 246. However, if the current value of the timer 252 exceeds the timing parameter 250, the security algorithm 142 may conclude that the occupant will be delayed.

Figure 27:
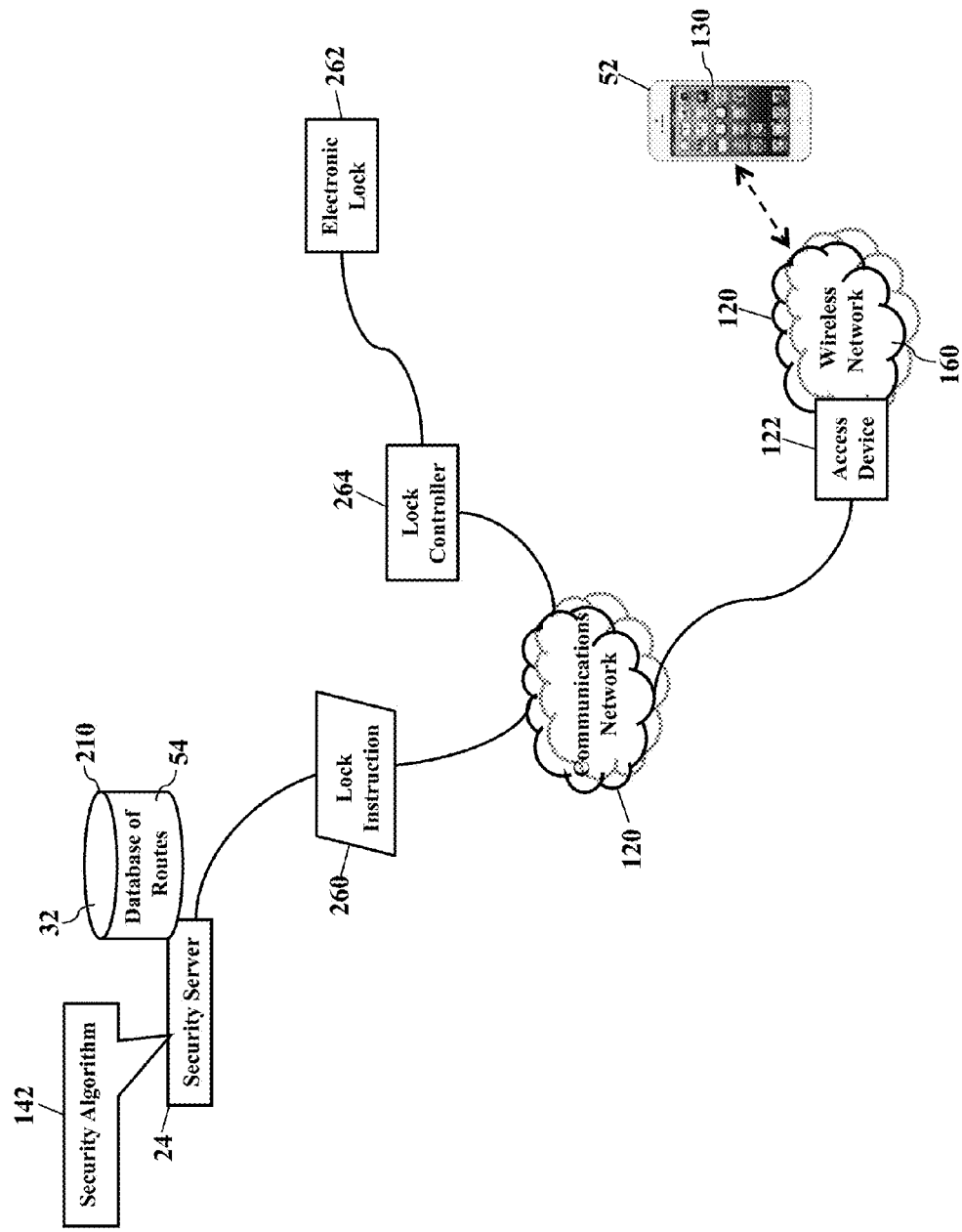
FIG. 27 illustrates lock instructions, according to exemplary embodiments.

FIG. 27 illustrates lock instructions, according to exemplary embodiments. As the reader may imagine, some doors should be locked during a crisis while other doors should unlock. The security server 24, then, may generate and send a lock instruction 260 to lock or unlock an electronic lock 262. FIG. 27 illustrates the packetized lock instruction 260 routing along the communications network 120 to a network address associated with an electronic lock controller 264. The lock instruction 260 may thus have an electronic database association with the evacuation route 54 that is pre-configured for the smartphone's current location 32. Exemplary embodiments may thus lock, and/or unlock, doors along the evacuation route 54 to ensure the occupant does not stray off course. For example, if a room or hallway is not along the evacuation route 54, then the security server 24 may lock that corresponding door to prevent entry. In other words, only the doors along the predetermined evacuation route 54 may be operable. Circumstances will of course control different situations. When the security server 24 retrieves the evacuation route 54, the security server 24 may also retrieve and execute the corresponding lock instructions 50. The security server 24 may thus instruct the electronic lock controller 264 to activate physical locks, based on the current location 32 associated with the occupant's smartphone 52.

Figure 28:
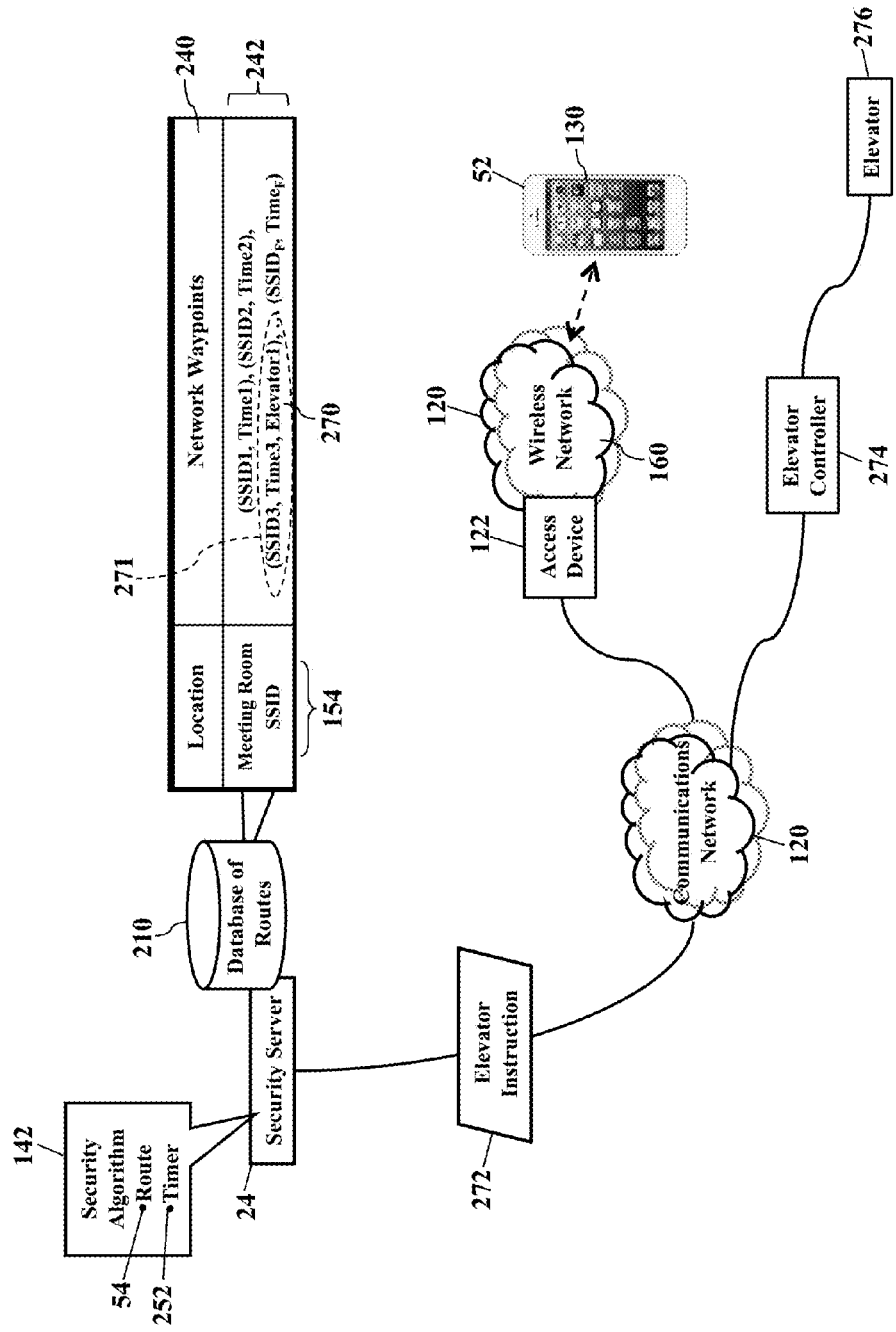
FIG. 28 illustrates elevator summons, according to exemplary embodiments.

FIG. 28 illustrates elevator summons, according to exemplary embodiments. As the smartphone 52 traverses the pre-approved evacuation route 54, at some point elevator service may be required. Some crisis management plans may deactivate elevators, thus forcing the occupants to climb or descend stairs to safety. Other crisis management plans, though, may embrace elevator service as a quick and efficient means of safely moving groups of people. Exemplary embodiments may thus track the movements of the occupants' wireless devices and summon elevators at appropriate moments in time or location. FIG. 28, for example, illustrates an elevator command 270 as a data triplet 271 inserted into one of the network waypoints 240. The elevator command 270 identifies which elevator (elevator number or identifier) is summoned for vertical travel from an entry floor to an exit floor. If a building only has one elevator, then perhaps the elevator command 270 may be simplified to a pair of data values. But many buildings may have multiple elevators, perhaps serving different floors. The elevator command (3, 1, 22), for example, may call or summon "Elevator #3" to "Floor #1" for lift service to "Floor #22." The opposite elevator command (3, 22, 1) would call "Elevator #3" to "Floor #22" for descend service to "Floor #1." Each elevator command 270 may thus be generated for insertion into the pre-determined sequential network waypoints 240. As the smartphone 52 satisfies each sequential network waypoint 240, the security server 24 may summon the corresponding elevator in the sequence. The security algorithm 142 may further initialize the timer 252 to count up or down until the summons. Exemplary embodiments, then, may insert the elevator command 270 at appropriate positions and/or times in the sequential network waypoints 240 and/or the sequential GPS waypoints (illustrated as reference numeral 220 in FIG. 24). As the security server 24 tracks the smartphone 52, the security server 24 may thus read, retrieve, and/or execute the elevator command 270 as one of the sequential steps. The security server 24 may thus generate an elevator instruction 272 that is sent into the communications network 120 for delivery to the network address associated with an elevator controller 274. The elevator controller 274 may then summon the corresponding elevator car 276 to load the occupants.

Exemplary embodiments thus automate crisis management plans. Today mobile devices may be locationally tracked with precision. This locational tracking may thus be used for much quicker decisions that save more lives. Exemplary embodiments may thus present each individual occupant with the predetermined evacuation route 54 to ensure her own safety and the safety of others. Moreover, exemplary embodiments may even electronically secure doors and windows to limit access, thus further ensuring the occupants maintain their individual evacuation route 54. Exemplary embodiments may even summon elevators for still faster evacuation of more people.

Figure 29:
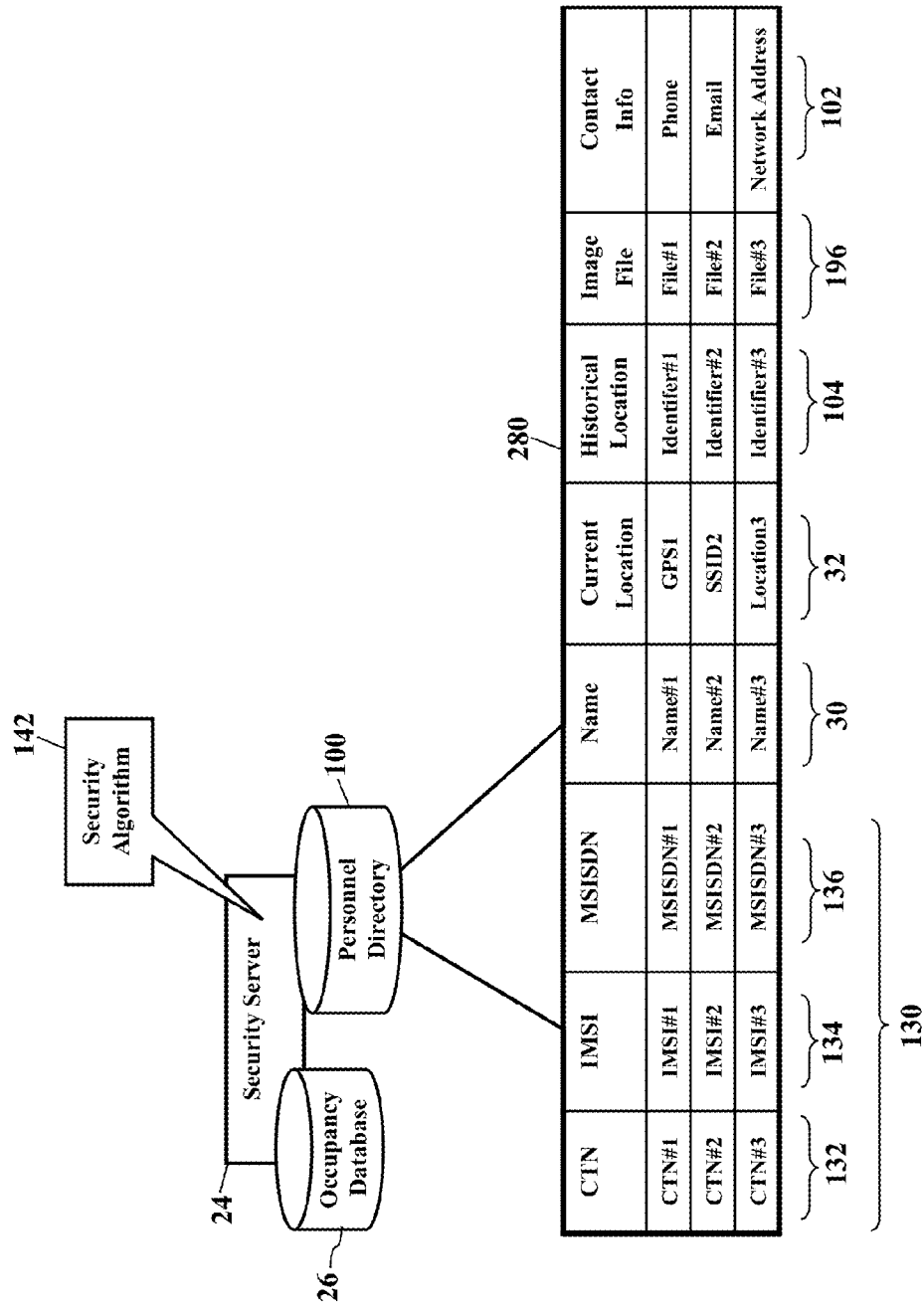
FIG. 29 illustrates a personnel directory, according to exemplary embodiments.

FIG. 29 illustrates the personnel directory 100, according to exemplary embodiments. As this disclosure above explained, the locational capabilities may be applied to the personnel directory 100. That is, the personnel directory 100 may be updated to reveal each occupant's current location 32, as tracked by the occupancy database 26. FIG. 29 thus illustrates the personnel directory 100 as a table 280 having electronic database associations between different cellular identifiers 130, their corresponding current location 32, and the organizational member's contact information 102. The personnel directory 100 may further include electronic associations with each member's digital image file 196. The personnel directory 100 may thus be automatically updated with each employee's, contractor's, or other member's current location 32. Moreover, as the occupancy database 26 may have historical entries that log past locations, the personnel directory 100 may further include an entry for the member's historical location 104, based on historical location information logged over time. The security algorithm 142 may determine the historical location 104 as a greatest accumulation of time the same location, thus revealing a lab, field environment, or customer office where the most time is accrued. Again, tracking both the current location 32 and the historical location 104 promotes face-to-face collaboration and spawns innovation.

Figure 30:
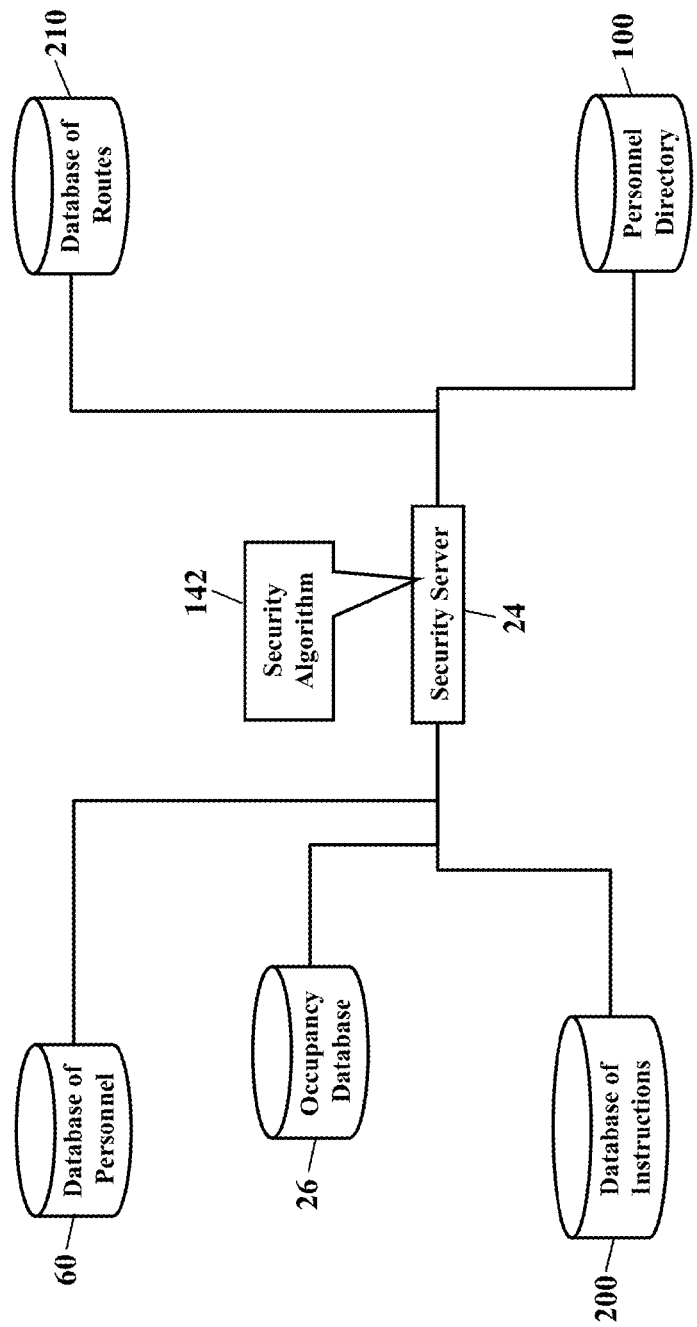
FIG. 30 illustrates an overall database scheme, according to exemplary embodiments.

FIG. 30 illustrates an overall database scheme, according to exemplary embodiments. Here the security server 24 may access any of the databases (illustrated as reference numerals 26, 60, 100, 200, and 210) to log locations and to evacuate personnel, as this disclosure explains. The databases may be individually maintained or grouped together, depending on networking, processing, and storage capabilities.

Figure 31:
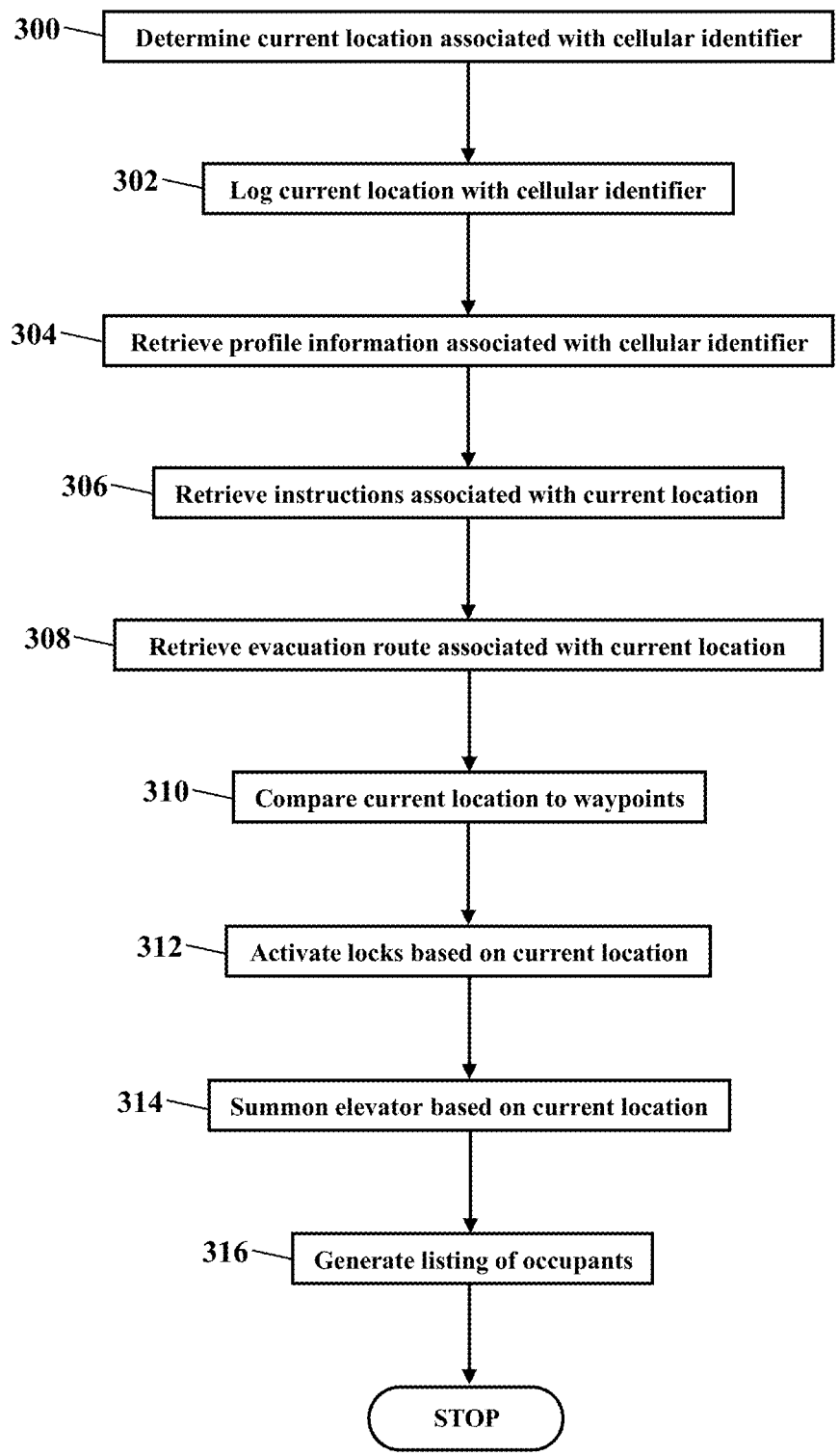
FIG. 31 is a flowchart illustrating an algorithm for emergency management, according to exemplary embodiments.

FIG. 31 is a flowchart illustrating an algorithm for emergency management, according to exemplary embodiments. The current location 32, associated with the cellular identifier 130, is determined (Block 300). The occupancy database 26 is updated with the current location 32 (Block 302). The profile information 90 (Block 304), the personal instruction (Block 306), and the evacuation instruction 54 (Block 308) are retrieved. The current location 32 is compared to the GPS or network waypoints (Block 310). Electronic locks are activated (Block 312) and elevators are summoned (Block 314). The listing 40 of occupants is generated (Block 316).

Figure 32:
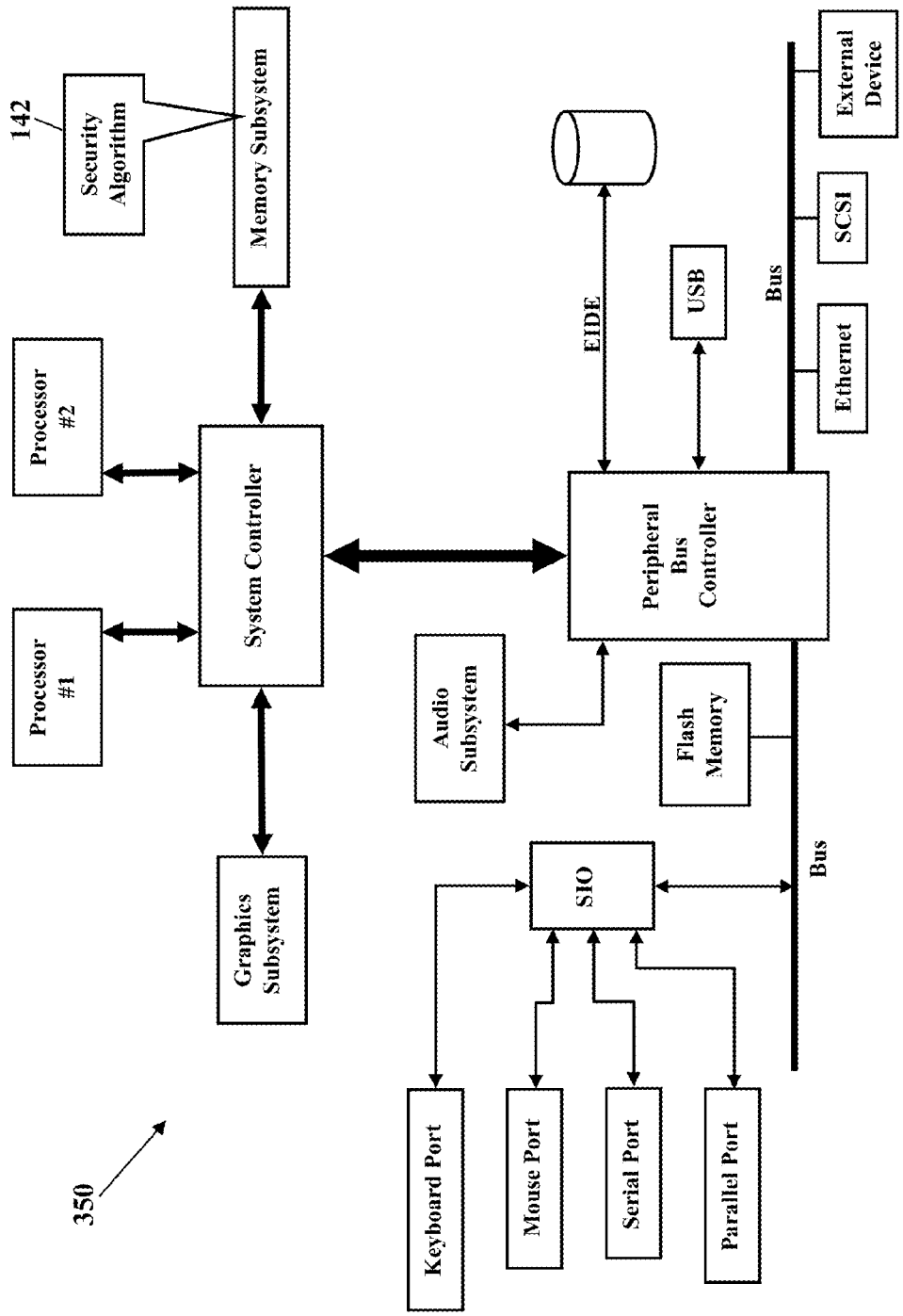
FIGS. 32-37 depict still more operating environments for additional aspects of the exemplary embodiments.

FIG. 32 illustrates still more exemplary embodiments. FIG. 32 is a more detailed diagram illustrating a processor-controlled device 350. As earlier paragraphs explained, exemplary embodiments may partially or entirely operate in any mobile or stationary processor-controlled device. FIG. 32, then, illustrates the security algorithm 142 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 33:
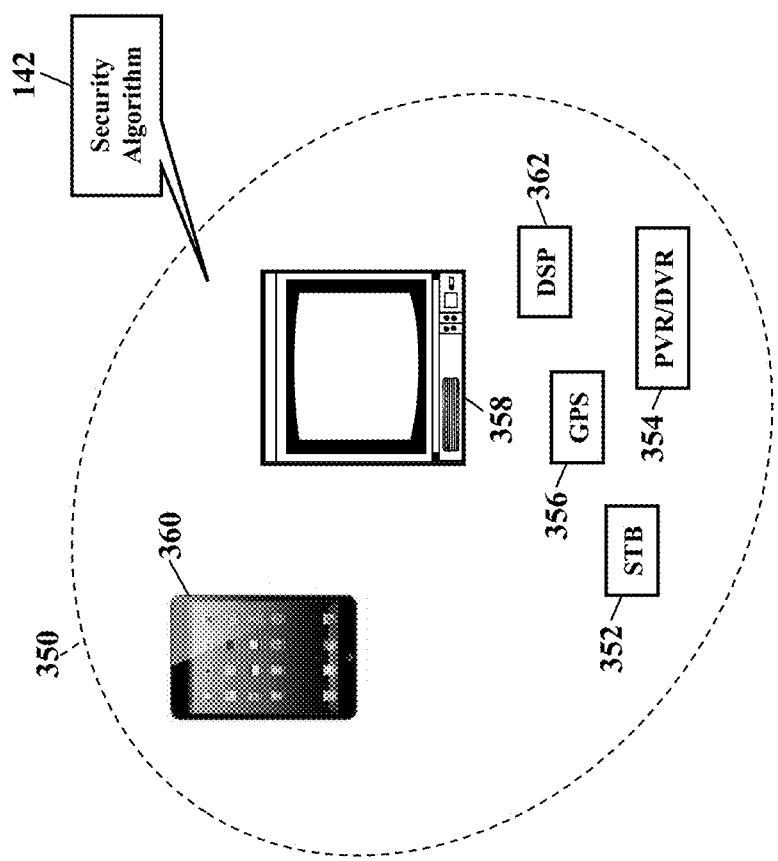

FIG. 33 depicts other possible operating environments for additional aspects of the exemplary embodiments. FIG. 33 illustrates the security algorithm 142 operating within various other processor-controlled devices 350. FIG. 33, for example, illustrates a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing the processor and/or a digital signal processor (DP/DSP) 362. The device 350 may also include watches, radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Figure 34:
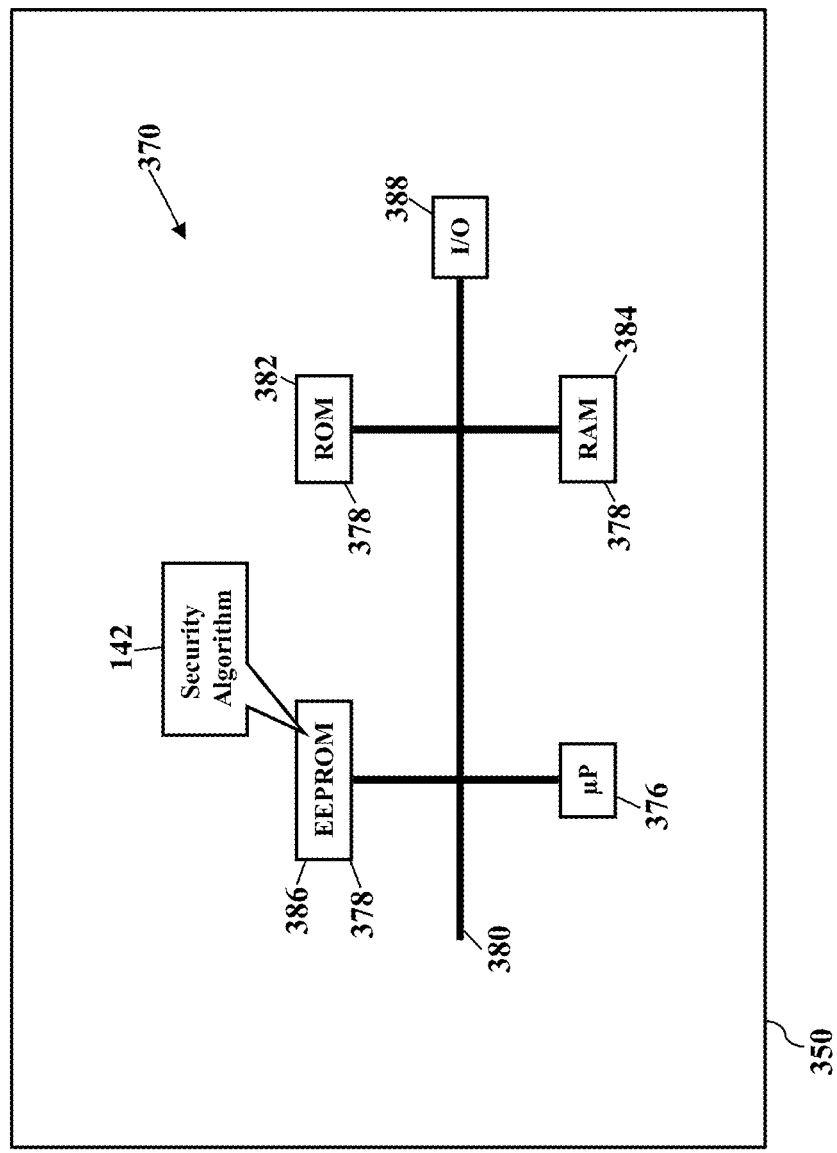
Figure 36:
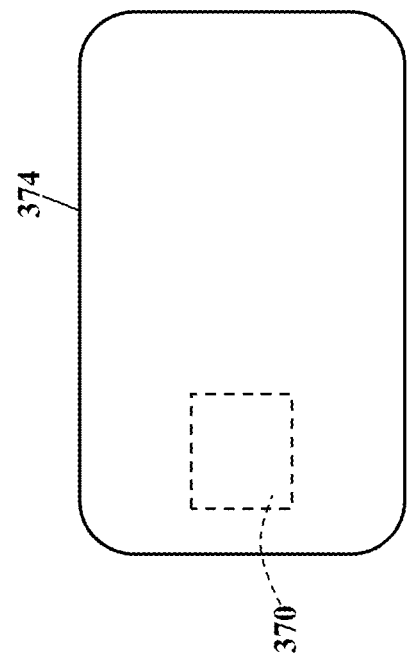
Figure 35:
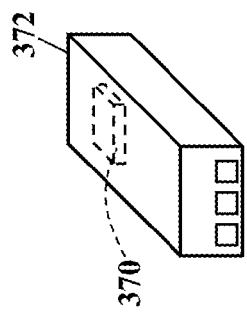

FIGS. 34-36 are schematics further illustrating the processor-controlled device 350, according to exemplary embodiments. FIG. 34 is a block diagram of a Subscriber Identity Module 370, while FIGS. 35 and 36 illustrate, respectively, the Subscriber Identity Module 370 embodied in a plug 372 and in a card 374. As those of ordinary skill in the art recognize, the Subscriber Identity Module 370 may be used in conjunction with many devices (such as the occupant's smartphone 52, the first responder's tablet computer 170, and the processor-controlled device 350). The Subscriber Identity Module 370 stores user information (such as a user's International Mobile Subscriber Identity, the user's $K_i$ number, and other user information) and any portion of the security algorithm 142. As those of ordinary skill in the art also recognize, the plug 372 and the card 374 each may interface with any mobile or stationary device.

FIG. 34 is a block diagram of the Subscriber Identity Module 370, whether embodied as the plug 372 of FIG. 35 or as the card 374 of FIG. 36. Here the Subscriber Identity Module 370 comprises a microprocessor 376 (μP) communicating with memory modules 378 via a data bus 380. The memory modules 328 may include Read Only Memory (ROM) 382, Random Access Memory (RAM) and or flash memory 384, and Electrically Erasable-Programmable Read Only Memory (EEPROM) 386. The Subscriber Identity Module 370 stores some or all of the security algorithm 142 in one or more of the memory modules 378. An Input/Output module 388 handles communication between the Subscriber Identity Module 370 and a host device. Because Subscriber Identity Modules are well known in the art, this patent will not further discuss the operation and the physical/memory structure of the Subscriber Identity Module 370.

Figure 37:
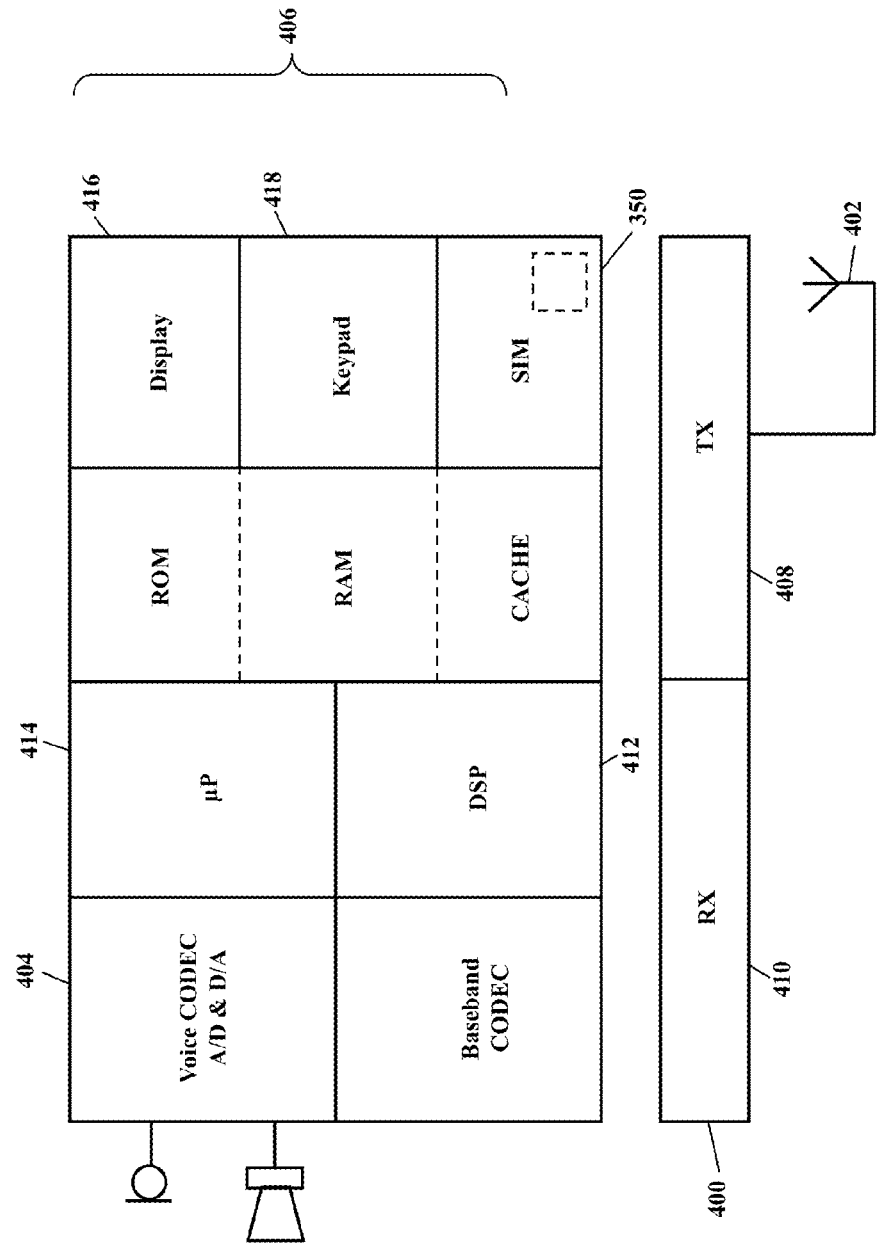

FIG. 37 is a schematic further illustrating the operating environment, according to exemplary embodiments. FIG. 37 is a block diagram illustrating more possible componentry of the processor-controlled device 350. The componentry may include one or more radio transceiver units 400, an antenna 402, a digital baseband chipset 404, and a man/machine interface (MMI) 406. The transceiver unit 400 includes transmitter circuitry 408 and receiver circuitry 410 for receiving and transmitting radio-frequency (RF) signals. The transceiver unit 400 couples to the antenna 402 for converting electrical current to and from electromagnetic waves. The digital baseband chipset 404 contains a digital signal processor (DSP) 412 and performs signal processing functions for audio (voice) signals and RF signals. As FIG. 37 shows, the digital baseband chipset 404 may also include an on-board microprocessor 414 that interacts with the man/machine interface (MMI) 406. The man/machine interface (MMI) 406 may comprise a display device 416, a keypad 418, and the Subscriber Identity Module 370. The on-board microprocessor 414 may also interface with the Subscriber Identity Module 370.

Exemplary embodiments may be applied to any signaling standard. As those of ordinary skill in the art recognize, FIGS. 34-37 may illustrate a Global System for Mobile (GSM) communications device. That is, the communications device may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for locational tracking for crisis management, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a hardware processor; and
a memory device, the memory device storing instructions, the instructions when executed causing the hardware processor to perform operations, the operations comprising:
determining a count of wireless devices registered with a wireless network;
querying an electronic database for the count of the wireless devices registered with the wireless network, the electronic database electronically associating routes to counts including the count of the wireless devices registered with the wireless network;
identifying a route of the routes in the electronic database that is electronically associated with the count of the wireless devices registered with the wireless network; and
monitoring locations associated with the wireless devices according to the route identified in the electronic database.

2. The system of claim 1, wherein the operations further comprise sending the route to any of the wireless devices registered with the wireless network.

3. The system of claim 1, wherein the operations further comprise sending the route to all of the wireless devices registered with the wireless network.

4. The system of claim 1, wherein the operations further comprise monitoring network waypoints of service set identifiers associated with the route.

5. The system of claim 1, wherein the operations further comprise assigning a task to one of the wireless devices registered with the wireless network.

6. The system of claim 1, wherein the operations further comprise sending the route to any one of the wireless devices registered with the wireless network.

7. The system of claim 1, wherein the operations further comprise monitoring network waypoints associated with the route.

8. A method, comprising:
determining, by a server, a count of wireless devices registered with a wireless network;
querying, by the server, an electronic database for the count of the wireless devices registered with the wireless network, the electronic database electronically associating routes to counts including the count of the wireless devices registered with the wireless network;
identifying, by the server, a route of the routes in the electronic database that is electronically associated with the count of the wireless devices registered with the wireless network; and
monitoring, by the server, locations associated with the wireless devices according to the route identified in the electronic database.

9. The method of claim 8, further comprising sending the route to any of the wireless devices registered with the wireless network.

10. The method of claim 8, further comprising sending the route to all of the wireless devices registered with the wireless network.

11. The method of claim 8, further comprising monitoring network waypoints associated with the route.

12. The method of claim 8, further comprising assigning a task to one of the wireless devices registered with the wireless network.

13. The method of claim 8, further comprising sending the route to any one of the wireless devices registered with the wireless network.

14. The method of claim 8, further comprising monitoring network waypoints of service set identifiers associated with the route.

15. A memory device storing instructions that when executed cause a hardware processor to perform operations, the operations comprising:
determining a count of wireless devices registered with a wireless network;
querying an electronic database for the count of the wireless devices registered with the wireless network, the electronic database electronically associating routes to counts including the count of the wireless devices registered with the wireless network;
identifying a route of the routes in the electronic database that is electronically associated with the count of the wireless devices registered with the wireless network; and
monitoring locations associated with the wireless devices according to the route identified in the electronic database.

16. The memory device of claim 15, wherein the operations further comprise sending the route to any of the wireless devices registered with the wireless network.

17. The memory device of claim 15, wherein the operations further comprise sending the route to all of the wireless devices registered with the wireless network.

18. The memory device of claim 15, wherein the operations further comprise monitoring network waypoints of service set identifiers associated with the route.

19. The memory device of claim 15, wherein the operations further comprise assigning a task to one of the wireless devices registered with the wireless network.

20. The memory device of claim 15, wherein the operations further comprise sending the route to any one of the wireless devices registered with the wireless network.

* * * * *